United States Patent
Koseki

(10) Patent No.: US 8,924,659 B2
(45) Date of Patent: *Dec. 30, 2014

(54) PERFORMANCE IMPROVEMENT IN FLASH MEMORY ACCESSES

(71) Applicant: Hitachi, Ltd., Tokyo (JP)

(72) Inventor: Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 13/760,144

(22) Filed: Feb. 6, 2013

(65) Prior Publication Data

US 2013/0151762 A1 Jun. 13, 2013

Related U.S. Application Data

(63) Continuation of application No. 12/742,783, filed as application No. PCT/JP2010/002639 on Apr. 12, 2010, now Pat. No. 8,392,670.

(51) Int. Cl.
| | | |
|---|---|---|
| G06F 12/00 | (2006.01) | |
| G06F 12/02 | (2006.01) | |
| G06F 3/06 | (2006.01) | |

(52) U.S. Cl.
CPC ............ *G06F 12/0246* (2013.01); *G06F 3/061* (2013.01); *G06F 3/0644* (2013.01); *G06F 3/0688* (2013.01)
USPC .................... 711/154; 711/163; 711/E12.009; 365/189.011

(58) Field of Classification Search
CPC ............ G06F 12/0253; G06F 12/0276; G06F 3/0688; G06F 3/0644; G06F 3/061
USPC .................. 711/154, 170, 114, 163, E12.009; 365/233, 189.011
See application file for complete search history.

(56) References Cited

U.S. PATENT DOCUMENTS

| | | |
|---|---|---|
| 5,603,001 A | 2/1997 | Sukegawa et al. |
| 7,873,619 B1 * | 1/2011 | Faibish et al. ................. 707/705 |
| 7,944,762 B2 * | 5/2011 | Gorobets ....................... 365/194 |
| 8,027,194 B2 * | 9/2011 | Lee et al. .................. 365/185.03 |
| 8,614,919 B2 * | 12/2013 | Lee et al. ..................... 365/233.1 |
| 2005/0132103 A1 | 6/2005 | Yagisawa et al. |
| 2007/0260837 A1 | 11/2007 | Hsu |
| 2008/0229003 A1 | 9/2008 | Mizushima et al. |
| 2009/0150639 A1 | 6/2009 | Ohata |
| 2009/0168525 A1 | 7/2009 | Olbrich et al. |
| 2010/0049905 A1 | 2/2010 | Ouchi |
| 2011/0283046 A1 | 11/2011 | Koseki |
| 2012/0150811 A1 | 6/2012 | Thompson et al. |

FOREIGN PATENT DOCUMENTS

| | | |
|---|---|---|
| JP | 63147219 | 6/1988 |
| JP | 7302176 | 11/1995 |
| JP | 2000/105734 | 4/2000 |
| JP | 2005/182104 | 7/2005 |
| JP | 2007/66259 | 3/2007 |
| JP | 2009/140356 | 6/2009 |
| JP | 2009/282989 | 12/2009 |
| JP | 2010/049586 | 3/2010 |
| JP | 2002/366380 | 2/2012 |
| WO | 2006/078532 A2 | 7/2006 |
| WO | 2007/081638 A2 | 7/2007 |

\* cited by examiner

*Primary Examiner* — Pierre-Michel Bataille
(74) *Attorney, Agent, or Firm* — Brundidge & Stanger, P.C.

(57) ABSTRACT

The present invention aims to improve the performance of accessing flash memory used as a storage medium in a storage device. In the storage device in accordance with the present invention, a storage controller, before accessing the flash memory, queries a flash controller as to whether the flash memory is accessible.

19 Claims, 29 Drawing Sheets

FIG. 4

| LUN | Flash Box No | START LBA | LAST LBA |
|---|---|---|---|
| 0 | 001 | 0h | 4FFFFh |
| 1 | 002 | 0h | 4FFFFh |
| 2 | 001 | 50000h | 9FFFFh |
| 3 | 003 | 0h | 5FFFFh |
| 4 | 004 | 0h | 6FFFFh |
| 5 | 006 | 0h | 3FFFFh |
| 6 | 007 | 0h | 5FFFFh |
| 7 | 006 | 0h | 5FFFFh |
| ... | ... | ... | ... |

FIG. 5

| Cache Segment No. | LUN | LBA | LENGTH |
|---|---|---|---|
| 0 | 11 | 56735Ah | 32 |
| 1 | 3 | A454ABh | 8 |
| 2 | 43 | 467810h | 8 |
| ... | ... | ... | ... |

FIG. 6

| List No. 14241 | Transfer Source 14242 | Transfer Destination 14243 | Cache Segment No. 14244 | LENGTH 14245 | LUN 14246 | LBA 14247 |
|---|---|---|---|---|---|---|
| 0 | Mem | FE | 100 | 32 | 1 | 12435Ah |
| 1 | Mem | BE | 43 | 16 | 43 | 654AB3h |
| 2 | FE | Mem | 12 | 8 | 5 | 4FFF10h |
| ... | ... | ... | ... | ... | ... | ... |

| START LBA | Chip No | Block No | Page No |
|---|---|---|---|
| 0h | 0 | 0 | 0 |
| 20h | 0 | 0 | 1 |
| 40h | 0 | 0 | 2 |
| 60h | 0 | 0 | 3 |
| ... | ... | ... | ... |
| 1000800h | 5 | 8 | 64 |
| ... | ... | ... | ... |
| 2125800h | 103 | 53 | 56 |
| 2125820h | 103 | 53 | 57 |
| ... | ... | ... | ... |

FIG. 13

| Chip No | Block No | Attribute | Status | Residual Number of Valid Pages | Number of Erasures |
|---|---|---|---|---|---|
| 0 | 1 | Normal | Normal | 3 | 112343 |
| 0 | 2 | Alternate | n/a | n/a | 32454 |
| 0 | 3 | Normal | GC | n/a | 13433 |
| ... | ... | ... | ... | ... | ... |
| 45 | 125 | Alternate | GC | n/a | 2434 |
| 45 | 126 | Normal | WL | n/a | 44456 |
| ... | ... | ... | ... | ... | ... |

| Segment No. | Flash Box No | START LBA | LAST LBA |
|---|---|---|---|
| 000 | 001 | 0h | FFFFh |
| 001 | 002 | 10000h | 1FFFFh |
| 002 | 001 | 50000h | 5FFFFh |
| 003 | 003 | 50000h | 5FFFFh |
| 004 | 004 | 0h | FFFFh |
| 005 | 006 | 0h | FFFFh |
| 006 | 007 | 10000h | 1FFFFh |
| 007 | 006 | 30000h | 3FFFFh |
| ... | ... | ... | ... |

| LUN | LU Size | Segment No. |
|---|---|---|
| 0 | 100GB | 001 |
| | | 023 |
| | | 100 |
| | | 422 |
| | | 003 |
| | | 343 |
| | | n/a |
| | | ... |
| | | n/a |

| Segment No. | Number of Write Commands | Number of Read Commands |
|---|---|---|
| 000 | 12345 | 432125 |
| 001 | 433 | 533 |
| 002 | 43321423 | 4466 |
| 003 | 544545 | 76778 |
| 004 | 54322 | 42341 |
| 005 | 343 | 545436 |
| 006 | 341 | 4534 |
| 007 | 4112344 | 364646 |
| ... | ... | ... |

PERFORMANCE IMPROVEMENT IN FLASH MEMORY ACCESSES

CROSS REFERENCED TO RELATED APPLICATIONS

The present application is a continuation of application Ser. No. 12/742,783, filed May 13, 2010, now U.S. Pat. No. 8,392,670; which claims priority from PCT/JP2010/002639, filed Apr. 12, 2010, the contents of which are incorporated herein by reference.

TECHNICAL FIELD

The present invention relates to a storage device.

BACKGROUND OF THE INVENTION

A storage device is a device that has a disk for storing data and a controller for controlling the disk and is intended to provide a high-capacity data storage space to a host or a computer that is connected to the storage device.

When a storage device is constructed from a plurality of disks with a RAID (Redundant Array of Independent (or Inexpensive) Disks) configuration, the I/O processing speed can be increased and high fault tolerance against disk failures can be achieved.

Patent Literature 1 below discloses a storage device having an HDD (Hard Disk Drive) as a storage medium.

Meanwhile, in recent years, flash memory has been gaining increased attention as a new storage medium. Flash memory is characterized by its faster read and write times than those of HDDs. For example, although HDDs have read and write times each on the order of several milliseconds, there has been reported a performance data example of NAND flash memory that has a read time of 25 microsecond and a write time of 300 microsecond.

In addition, flash memory, unlike HDDs, has another characteristic that its physical area to which data has been written once cannot be overwritten. In order to rewrite data in flash memory, it is necessary to once erase the data on a "block" basis. However, flash memory has a limited number of write cycles due to the physical reasons of memory cells for storing information. Further, there has been reported data that flash memory requires an erase time of about 1 ms.

In order to address the aforementioned limitations, flash memory typically employs a method in which the correspondence relationship between the address and the cell location that is shown to a host system is retained, and when data stored in a block is to be updated, the update data is stored into an empty page, in which data is not written, and the original data stored in the block is invalidated. However, as the data is updated repeatedly, the number of empty pages will decrease. As a technique of addressing a shortage of empty pages, a technique called "garbage collection (hereinafter referred to as GC)" has been laid open to the public. Other than the GC, there has also been known a technique called "wear leveling (hereinafter referred to as WL)" which makes equal the number of write operations performed to each cell.

CITATION LIST

Patent Literature

PTL 1: JP Patent Publication (Kokai) No. 2005-182104 A

SUMMARY OF INVENTION

Technical Problem

As described above, although flash memory has a very fast read time, it can be said to be a device having slow write and erase times. Further, from the aspect of control, flash memory should be controlled with GC, WL, or the like that has not been used for the conventional HDDs.

For example, in data writing (hereinafter referred to as "write"), if there are no sufficient empty pages for storing update data, empty pages are secured by executing GC once; thereafter, data is stored into the secured empty pages. In such a case, time required for the completion of the write processing corresponds to the sum of the GC execution time+the actual data write time. In particular, since flash memory requires long data write and erase times, it may take several milliseconds until the completion of the write processing in some cases. This, however, could result in degraded performance down to a level of, or below the performance of HDDs.

FIG. 1 is a diagram illustrating the aforementioned problem with flash memory. When GC+write (which is described as "Program" in FIG. 1) are executed to flash memory in response to a write request issued from a storage controller that controls a storage system to a flash controller that controls the flash memory, the storage controller must wait for a long time until the completion of the write. In this period, the storage controller would keep consuming resources of devices such as cache memory for temporally storing data, which could result in degraded performance.

The present invention has been made in order to solve the aforementioned problem. It is an object of the present invention to improve the performance of accessing flash memory used as a storage medium in a storage device.

Solution to Problem

In a storage device in accordance with the present invention, a storage controller, before accessing flash memory, queries a flash controller as to whether the flash memory is accessible.

Advantageous Effects of Invention

According to a storage device of the present invention, whether flash memory is accessible is queried in advance, whereby the wait time in which the flash memory is inaccessible can be reduced. Accordingly, the substantial access performance to the flash memory can be improved.

BRIEF DESCRIPTION OF DRAWINGS

FIG. 4 is a structure diagram of an LU management table 1422 for managing the address spaces of LUs.

FIG. 5 is a structure diagram of a memory management table 1423.

FIG. 6 is a structure diagram of a transfer list 1424.

FIG. 12 is a structure diagram of an address management table 22422.

FIG. 13 is a structure diagram of a block management table 22423.

FIG. 26 is a structure diagram of a segment management table 1426.

FIG. 27 is a structure diagram of an LU management table 1427.

FIG. 28 is a structure diagram of a statistical information management table 1428.

DESCRIPTION OF THE PREFERRED EMBODIMENTS

Embodiment 1

Figure 1:
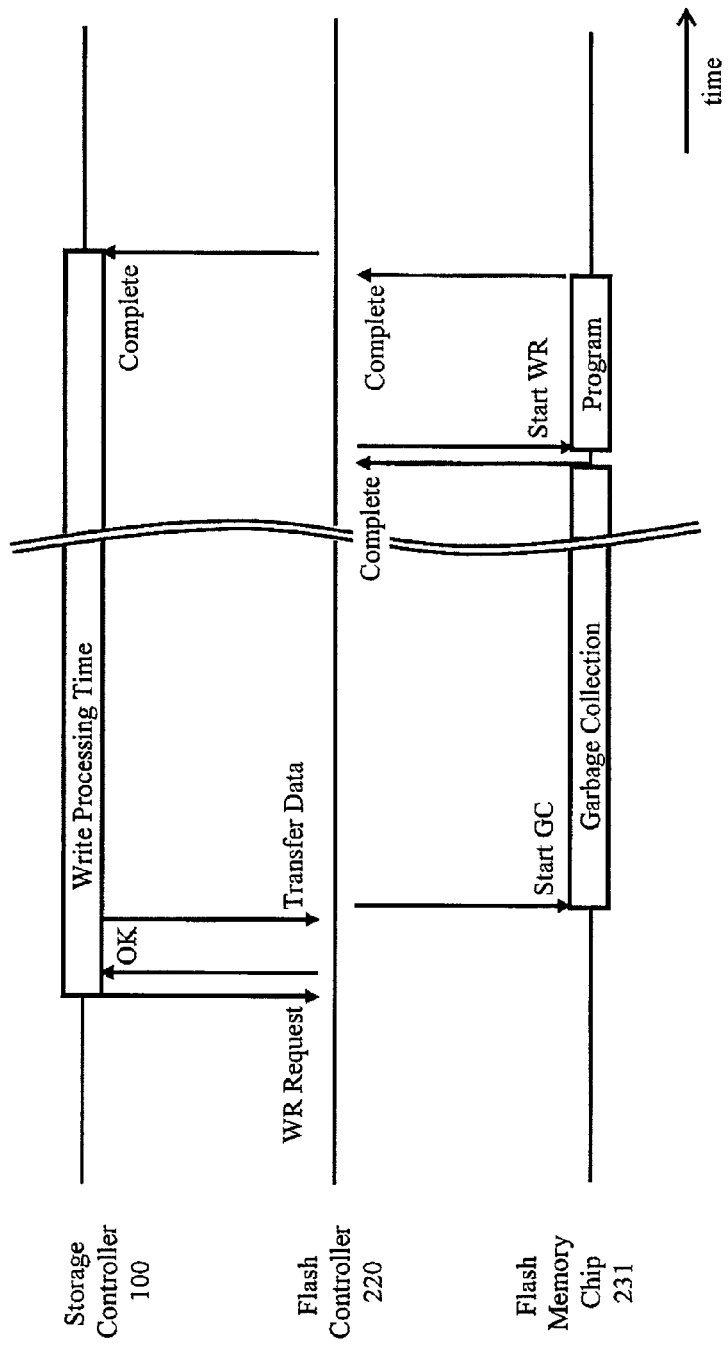
FIG. 1 is a diagram illustrating the aforementioned problem with flash memory.
Figure 2:
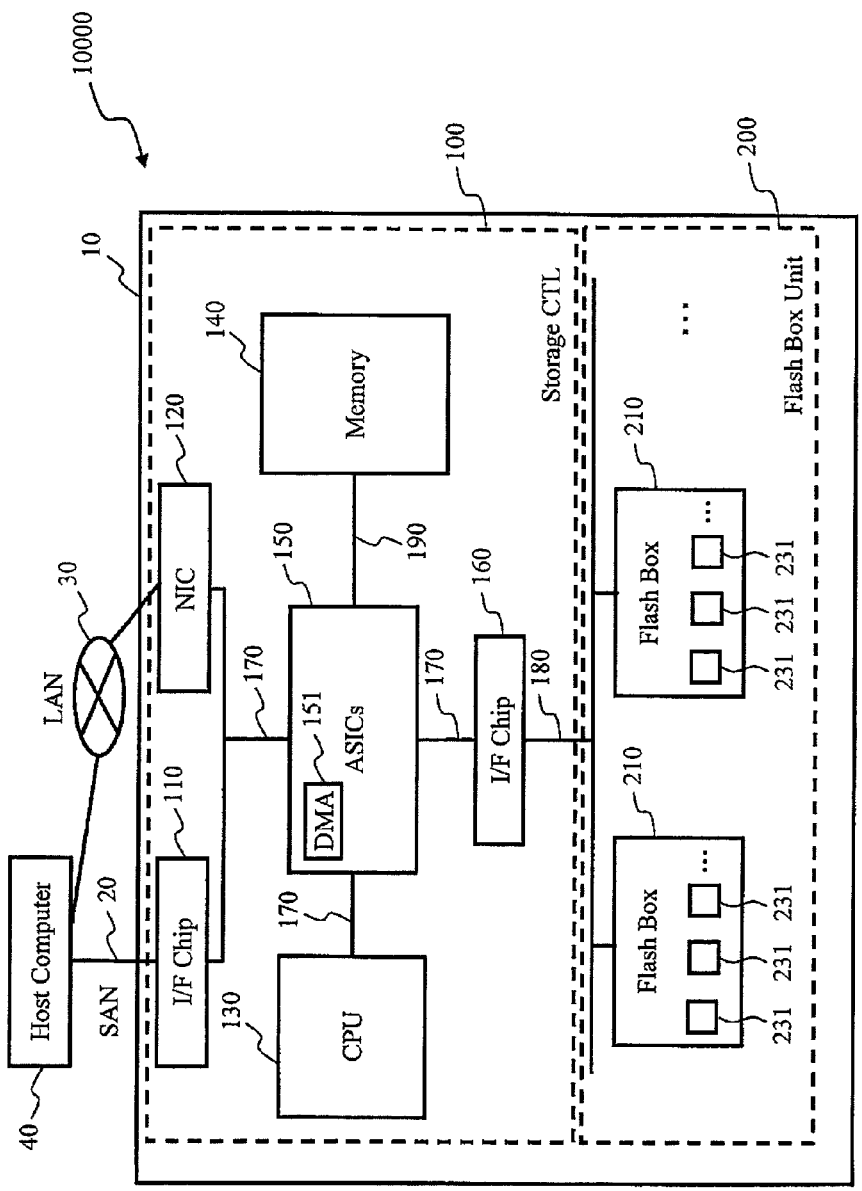
FIG. 2 is a diagram showing the configuration of a storage system 10000 in accordance with Embodiment 1.

FIG. 2 is a diagram showing the configuration of a storage system 10000 in accordance with Embodiment 1 of the present invention. The storage system 10000 includes a storage device 10 and a host computer 40. The host computer 40 is a host system that uses the storage device 10, such as an application server.

The storage device 10 includes a storage controller 100 and a flash box unit 200. The storage controller 100 controls the operation of the storage device 10. The flash box unit 200 includes flash memory for storing data.

The host computer 40 is connected to the storage device 10 via an I/F chip 110 of the storage controller 100. A SAN (Storage Area Network) 20, for example, is used as an interface for connecting the storage device 10 and the host computer 40. As the SAN 20, Fibre Channel, SCSI (Small Computer System Interface), iSCSI (internet Small Computer System Interface), USB (Universal Serial Bus), IEEE 1394 bus, SAS (Serial Attached SCSI), or the like can be used, for example. More than one host computer 40 can be connected to the storage device 10. In addition, other types of interfaces can be used instead of the SAN 20.

The host computer 40 has installed thereon control software that issues control commands and the like to the storage device 10. The storage controller 100 of the storage device 10, upon receipt of such control commands and the like, executes its own control software to thereby control the operation of the storage device 10. As the storage device 10 and the host computer 40 communicate via a LAN (Local Area Network) 30, for example, the storage controller 100 has an MC (Network Interface Card) 120 that is an interface for connecting the storage device 10 to the LAN 30. As a computer that manages, controls, or maintains the storage device 10, a different computer other than the host computer 40 can be used. In addition, other types of communication networks can be used instead of the LAN 30.

Further, the storage controller 100 includes ASICs (Application Specific Integrated Circuits) 150, a CPU (Central Processing Unit) 130, memory 140, and an I/F chip 160. The ASICs 150 perform a parity operation and the like when RAID is constructed. The CPU 130 controls the entire storage device 10. The memory 140 has stored therein computer programs and data that are necessary for the CPU 130 to control the storage device 10. The I/F chip 160 connects the storage controller 100 and the flash box unit 200.

The ASICs 150 include a DMA (Direct Memory Access) transfer unit 151. The DMA transfer unit 151 transfers data in accordance with a transfer list stored in the memory 140. It should be noted that the DMA transfer unit 151 may be incorporated in a device other than the ASICs 150, such as the I/F chip 110 or 160.

Each of the I/F chip 110, the MC 120, the CPU 130, and the I/F chip 160 is connected to the ASICs 150 via a dedicated connection bus 170 such as a PCI (Peripheral Component Interconnect). The memory 140 is connected to the ASICs 150 via a dedicated connection bus 190 such as a DDR3 (Double Data Rate 3).

The storage controller 100 accesses flash memory chips 231 via a flash controller 220 described below. It should be noted that although the storage controller 100 will be hereinafter described as accessing the flash memory chips 231 for the sake of convenience of the description, what actually accesses the flash memory chips 231 is the flash controller 220.

The flash box unit 200 includes a plurality of flash boxes 210. The flash box unit 200 and the storage controller 100 are connected via the I/F chip 160 and a dedicated bus 180 such as Fibre Channel or SAS. Each flash box 210 includes a plurality of flash memory chips 231. Though not shown, the plurality of memory chips 231 constitute an RAID group.

Figure 3:
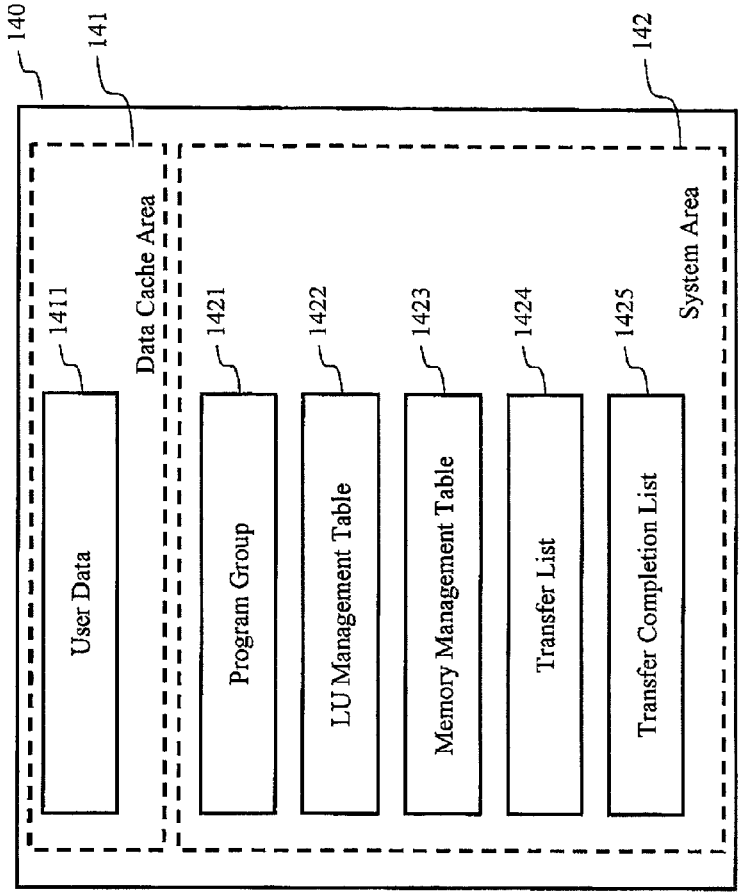
FIG. 3 is a structure diagram of memory 140.

FIG. 3 is a structure diagram of the memory 140. The memory 140 includes a data cache area 141 and a system area 142. The data cache area 141 is an area used to temporarily store user data. The system area 142 has stored therein programs and various tables for controlling the storage device 10.

The data cache area 141 is divided into a plurality of cache segments of a given size so that user data 1411 is stored on a cache segment basis. The user data 1411 is, for example, data read from or written to the storage device 10 by the host computer 40.

The system area 142 has stored therein a program group 1421, an LU management table 1422, a memory management table 1423, a transfer list 1424, and a transfer completion list 1425. The program group 1421 includes various programs executed by the CPU 130. The LU management table 1422 manages the address spaces of LUs (Logical Units) created in the RAID group of the flash memory 231. LU represents a unit for providing a storage area of the storage device 10 to the outside of the storage device 10. The memory management table 1423 manages the cache segments in the data cache area 141. The transfer list 1424 is used for the CPU 130 to instruct the ASICs 150 to execute DMA transfer. The transfer completion list 1425 is used for the ASICs 150 to inform the CPU 130 of the completion of the DMA transfer.

FIG. 4 is a structure diagram of the LU management table 1422 for managing the address spaces of LUs. The LU management table 1422 contains a LUN (Logical Unit Number) 14221, flash box No. 14222, start LBA 14223, and last LBA 14224.

The LUN 14221 indicates the identifier of a created LU, and a unique number is assigned to each LU. The flash box No. 14222 indicates the number of the flash box 210 in which the LU is created. The start LBA 14223 and the last LBA 14224 indicate the location of the LU address space in the flash box 210, that is, each of the start address and the end address of the LU is indicated by an LBA (Logical Block Address).

FIG. 5 is a structure diagram of the memory management table 1423. The memory management table 1423 contains a cache segment No. 14231, LUN 14232, LBA 14233, and length 14234.

The cache segment No. 14231 is the identifier of each cache segment in the data cache area 141, and a unique number is assigned to each cache segment. Each of the LUN 14232, the LBA 14233, and the length 14234 is information for managing user data stored in the cache segment. The LUN 14232 indicates the identification number of an LU in which the relevant data is stored. The LBA 14233 indicates the start address of the data. The length 14234 indicates the length of the data.

FIG. 6 is a structure diagram of the transfer list 1424. The transfer list 1424 contains a list No. 14241, transfer source 14242, transfer destination 14243, cache segment No. 14244, length 14245, LUN 14246, and LBA 14247.

The list No. 14241 is the identifier of each transfer list, and a unique number is assigned to each list. The transfer source 14242 and the transfer destination 14243 are the parameters for managing the data transfer direction. For example, the transfer source indicating "Mem" and the transfer destination indicating "FE (Front End)" means the data transfer from the memory 140 to the I/F chip 110. Meanwhile, the transfer source indicating "Mem" and the transfer destination indicating "BE (Back End)" means the data transfer from the memory 140 to the I/F chip 160. The cache segment No. 14244 and the length 14245 indicate the location of the cache segment in which data to be DMA-transferred is to be stored (or stored) and the size of the data to be transferred, respectively. The LUN 14246 and the LBA 14247 indicate the identification number and the start address of an LU to which the data to be transferred belongs, respectively.

Figure 7:
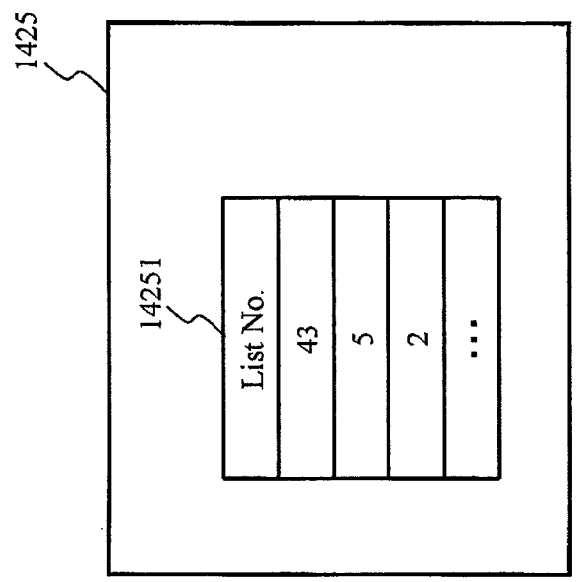
FIG. 7 is a structure diagram of a transfer completion list 1425.

FIG. 7 is a structure diagram of the transfer completion list 1425. The transfer completion list 1425 contains a transfer list No. 14251. The transfer list No. 14251 has stored therein the value of the list No. 14241 whose transfer has been completed. By referring to the transfer completion list 1425, it is possible to check which transfer request has been completed.

Figure 8:
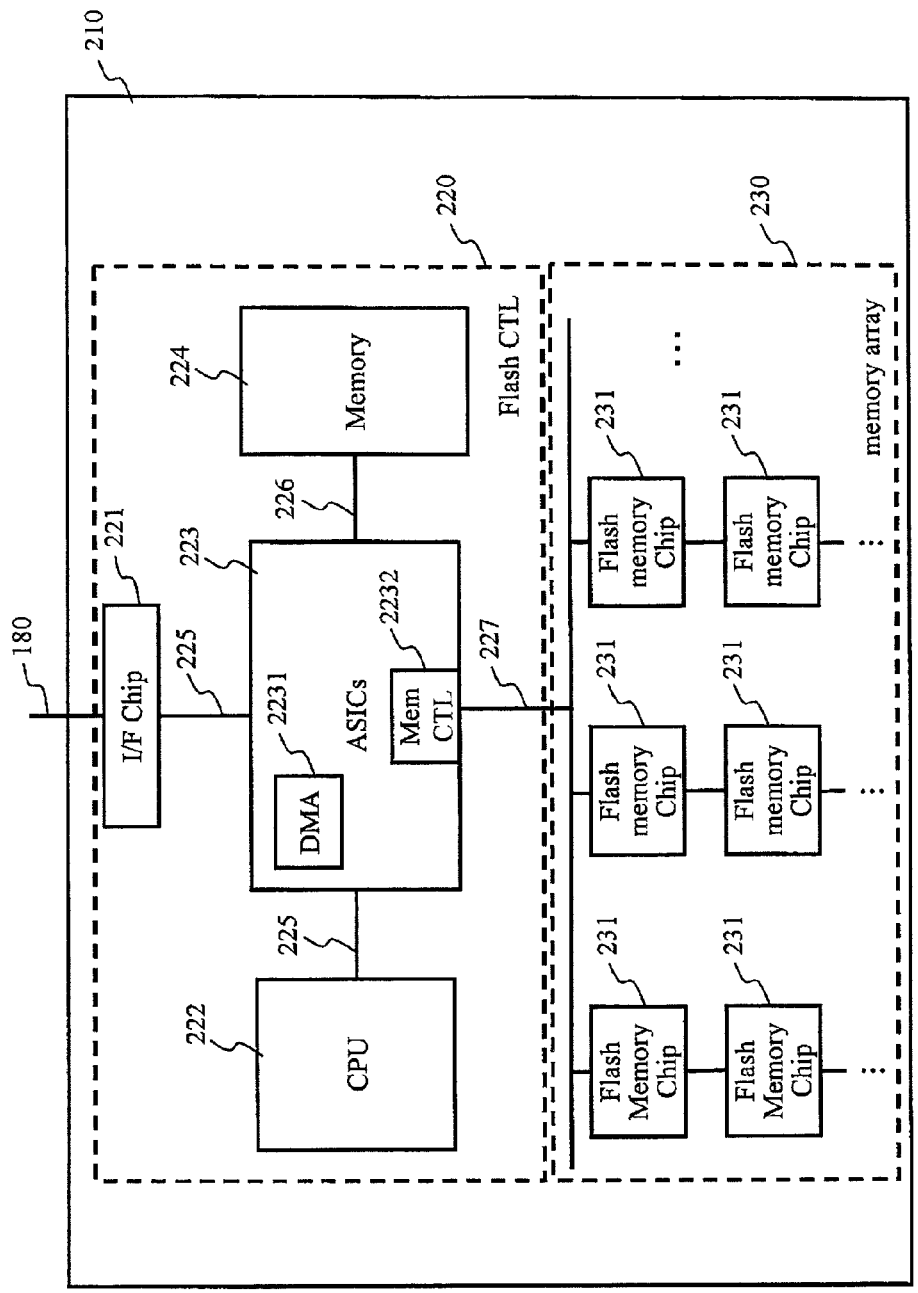
FIG. 8 is a configuration diagram of a flash box 210.

FIG. 8 is a configuration diagram of each flash box 210. The flash box 210 includes a flash controller 220 and a memory array 230. The flash controller 220 controls the entire flash box 210. The memory array 230 includes the plurality of flash memory chips 231.

The flash controller 220 includes an I/F chip 221, a CPU 222, ASICs 223, and memory 224.

The I/F chip 221 is used to connect the flash controller 220 and the storage controller 100. The I/F chip 221 and the storage controller 100 are connected via the connecting bus 180 described above. The CPU 222 controls the entire flash box 210. The memory 224 has stored therein computer programs and data that are necessary for the CPU 222 to control the flash box 210. The ASICs 223 provide functions for controlling the flash memory chips 231 such as GC or WL.

The ASICs 223 include a DMA transfer unit 2231 and a memory controller (Mem CTL) 2232. The memory controller 2232 manages the basic operations such as read, write, and erasure performed to the flash memory chips 231. Such functional unit may be incorporated in a device other than the ASICs 223. Alternatively, the memory controller 2232 may be provided separately as a single unit.

The ASICs 223 are connected to each of the CPU 222 and the I/F chip 221 via a dedicated bus 225 such as a PCI. The ASICs 223 are also connected to the memory 224 via a dedicated bus 226 such as a DDR 3. Further, the ASICs 223 are also connected to the flash memory chips 231 with a dedicated bus 227 via the memory controller 2232.

Figure 9:
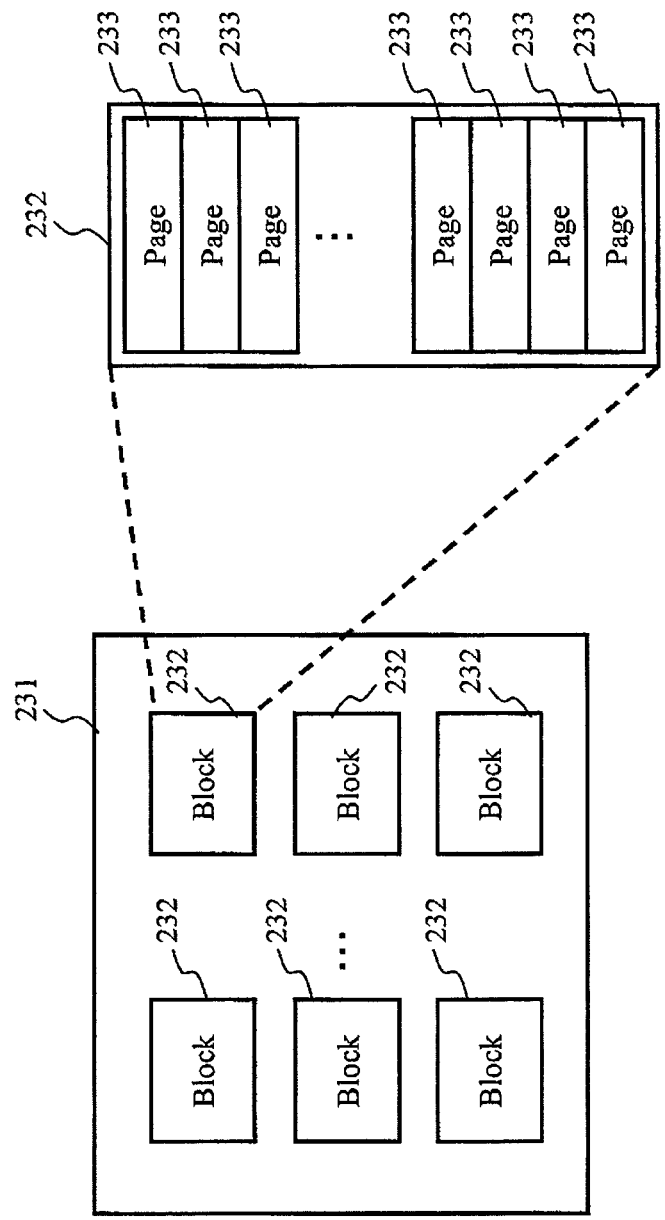
FIG. 9 is a configuration diagram of a flash memory chip 231.

FIG. 9 is a configuration diagram of the flash memory chip 231. The flash memory chip 231 includes a plurality of blocks 232, and the memory is erased per block 232. Each block 232 includes a plurality of pages 233 that are the minimum read/write units of the flash memory chip 231.

Figure 10:
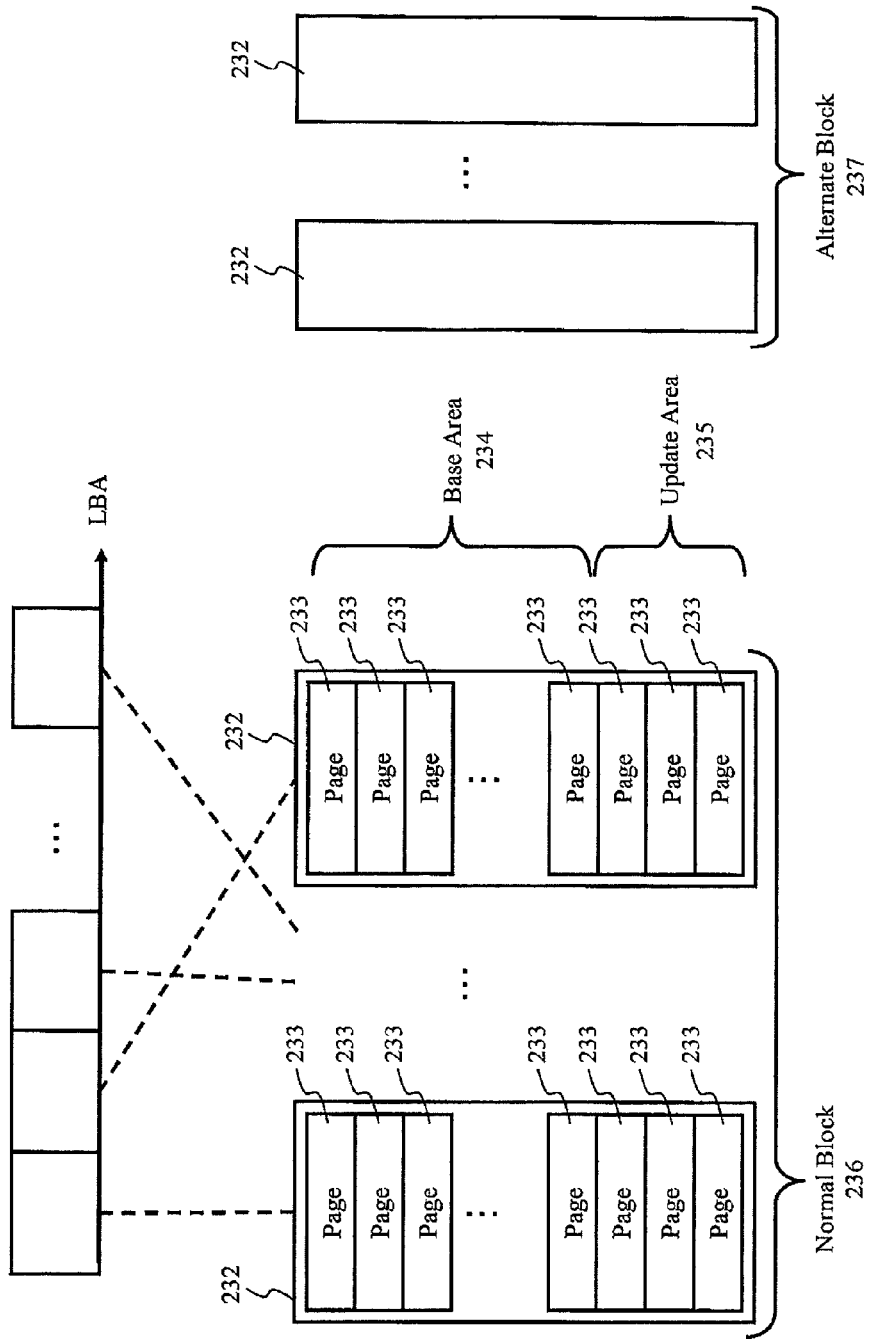
FIG. 10 is a diagram illustrating address assignment.

FIG. 10 is a diagram illustrating address assignment. The blocks 232 are divided in terms of attributes into a normal block 236 and an alternate block 237. The normal block 232 is a block recognized as an LU space by the storage controller 100. The alternate block 237 is used as a data migration destination when GC or WL is executed or as a replacement block when the normal block has crashed. Such attribute is not specific to each block 232, and is changed as needed in accordance with the usage state of each block 232.

Further, the pages 233 in the normal block 236 are divided into a base area 234 and an update area 235. The base area 234 is an area provided as a real address space to the host system, whereas the update area 235 is an area for, upon request to update pages, storing the target update data. Therefore, in a strict sense, the sum of the physical address spaces of the pages 233 that belong to the base area 234 is provided as a logical address space to the storage controller 100.

Although the logical address space seen from the storage controller 100 is unique, physical blocks that provide a particular logical address space are updated as needed. Therefore, the logical address recognized as an LBA by the storage controller 100 is always the same. Although Embodiment 1 illustrates an example in which the base area 234 and the update area 235 reside in the same block, such areas can be provided in separate blocks.

Figure 11:
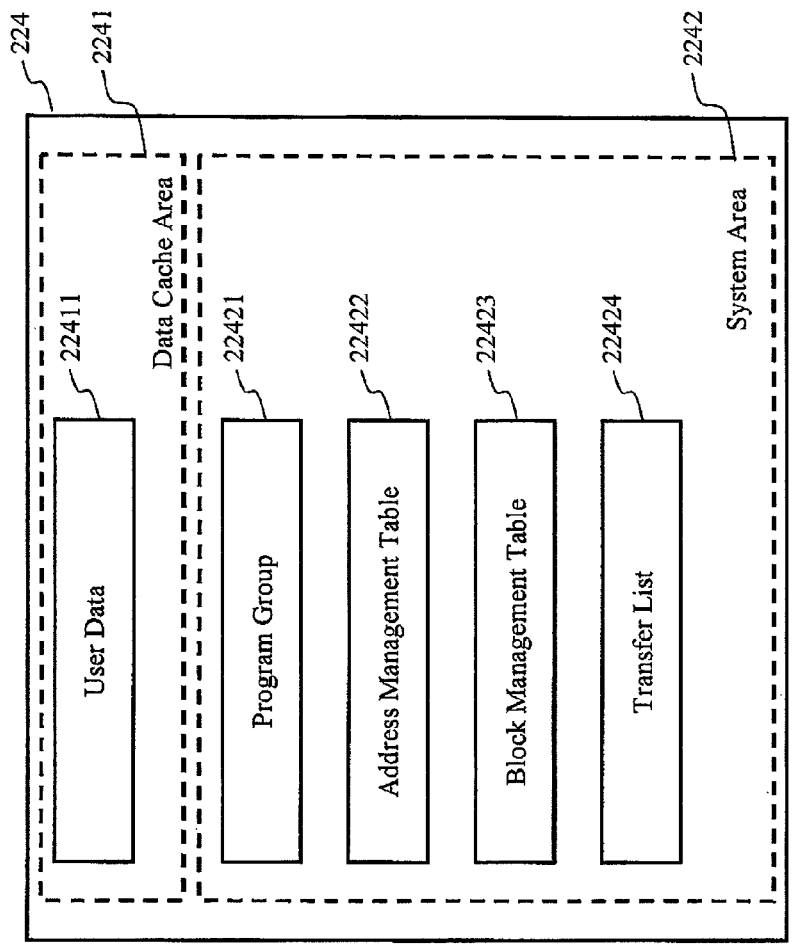
FIG. 11 is a structure diagram of memory 224.

FIG. 11 is a structure diagram of the memory 224. The memory 224 includes a data cache area 2241 and a system area 2242. The data cache area 2241 is an area used to temporarily store user data. The system area 2242 has stored therein programs and various tables for controlling the flash box 210.

The data cache area 2241 is divided into a plurality of segments of a given size so that user data 22411 is stored on a cache segment basis.

The system area 2242 has stored therein a program group 22421, an address management table 22422, a block management table 22423, and a transfer list 22424. The program group 22421 includes various programs executed by the CPU 222. The address management table 22422 manages the correspondence between the logical address and the physical address. The block management table 22423 manages the status of each block 232. The transfer list 22424 is used when the ASICs 223 execute DMA transfer.

FIG. 12 is a structure diagram of the address management table 22422. The address management table 22422 contains start LBA 224221, chip No. 224222, block No. 224223, and page No. 224224.

The start LBA 224221 indicates the offset value of LBA recognized by the storage controller 100. This value is determined by the size of the page 233 that is the minimum read/write unit of the flash memory chip 231. For example, when each page 233 has an address space of 20 h, the start LBA 224221 has values at intervals of 20 h. The chip No. 224222, the block No. 224223, and the page No. 224224 are information for identifying the page 233 corresponding to the logical address.

FIG. 13 is a structure diagram of the block management table 22423. The block management table 22423 contains a chip No. 224231, block No. 224232, attribute 224233, status 224234, the residual number of valid pages 224235, and the number of erasures 224236.

The chip No. 224231 indicates the number of the flash memory chip 231 to which the block 232 belongs. The block No. 224232 indicates the number of the block in the flash memory chip 231. Each block 232 is identified by the chip No. 224231 and the block No. 224232. The attribute 224233 indicates the attribute of the block 232 described with reference to FIG. 10, and either "Normal" or "Alternate" is set. The status 224234 indicates the operating status of each block 232. For example, "WL" is set when WL is executed to the relevant block, "GC" is set when GC is executed to the relevant block, "Normal" is set when read/write access to the relevant block is allowed, and "n/a" is set for other statuses. The residual number of valid pages 224235 indicates the residual number of the pages 233 that are assigned as the update area 235 within the relevant block 232. It should be noted that if the attribute of the relevant block is "Alternate," or if the processing of freeing pages such as WL or GC is executed, "n/a" is set. The number of erasures 224236 indicates the number of erase operations performed to the relevant block 232, and is mainly used to manage information about whether the relevant block 232 has been accessed up to its maximum allowable write access limit.

Figure 14:
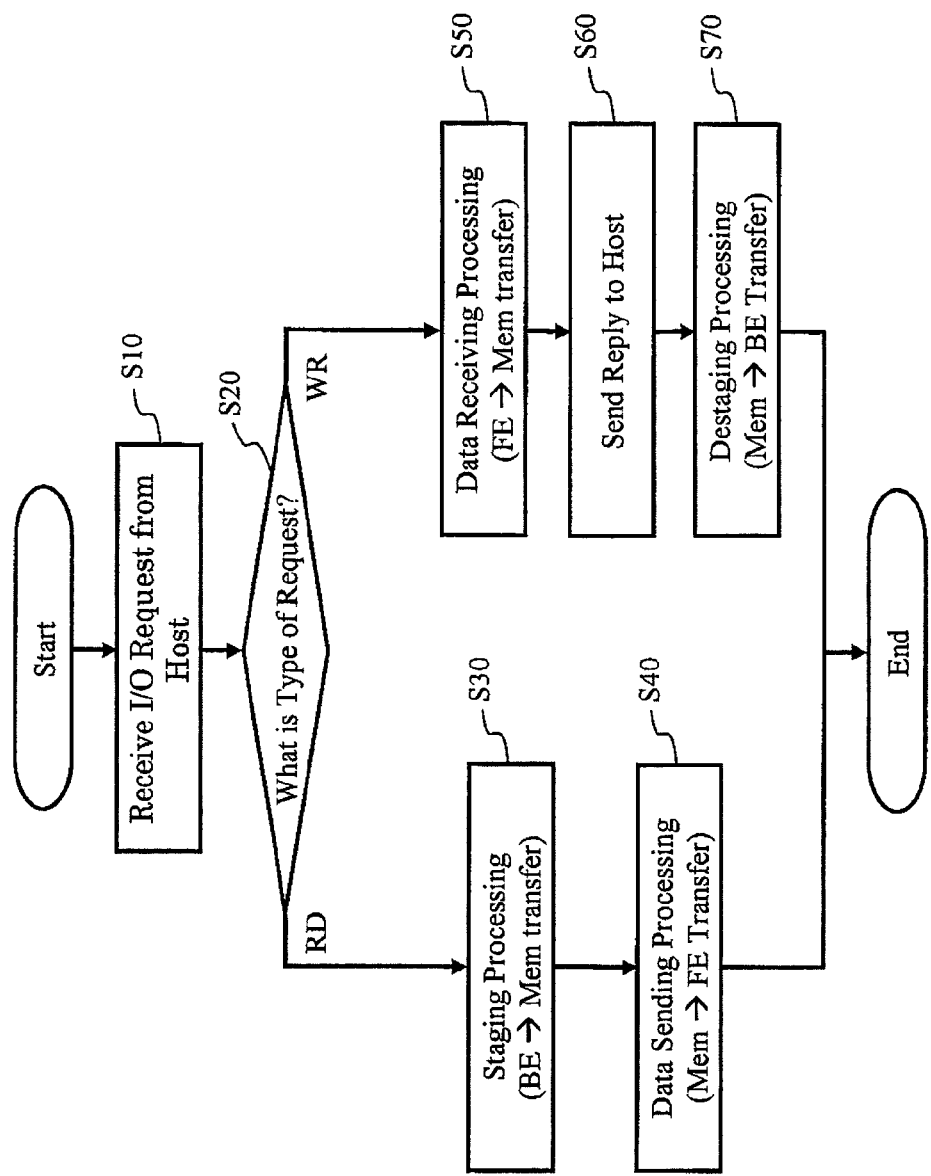
FIG. 14 is a flow chart illustrating the basic I/O sequence of a storage device 10.

FIG. 14 is a flow chart illustrating the basic I/O sequence of the storage device 10. Hereinafter, each step of FIG. 14 will be described.

(FIG. 14: Step S10)

The storage device 10 receives a data write request or a data read request (an I/O request) from the host computer 40, upon which the storage controller 100 starts the present flow chart.

(FIG. 14: Step S20)

The storage controller 100 determines whether the request received in step S10 is a read (RD) request or a write (WR) request. If the request is determined to be a read request, the flow proceeds to step S30, and if the request is determined to be a write request, the flow proceeds to step S50.

(FIG. 14: Step S30)

The storage controller 100 executes staging processing in which data requested to be read is transferred from the flash box 210 to the memory 140. The details of the present step will be described below with reference to FIGS. 15 and 16.

(FIG. 14: Step S40)

The storage controller 100 transmits the data, which has been transferred from the flash box 210 to the memory 140 in step S30, to the host computer 40. By this step, the processing of the read request issued from the host computer 40 terminates.

(FIG. 14: Step S50)

The storage controller 100 requests the host computer 40 to transfer data that is requested to be written. Then, the storage controller 100 receives the data and stores it into the memory 140.

(FIG. 14: Step S60)

The storage controller 100 informs the host computer 40 of the successful completion of the transfer.

(FIG. 14: Step S70)

The storage controller 100 executes destaging processing in which data retained in the memory 140 is stored into the flash box 210. Although the destaging processing is executed each time a write request is issued in this drawing, the destaging processing can be executed at any given time. In that case, destaging processing is collectively executed after steps S50 to S60 are repeated a plurality of times. Accordingly, the target data to be written can be collectively transferred to the flash box 210 through single destaging processing, whereby the processing efficiency can be expected to be increased.

Figure 15:
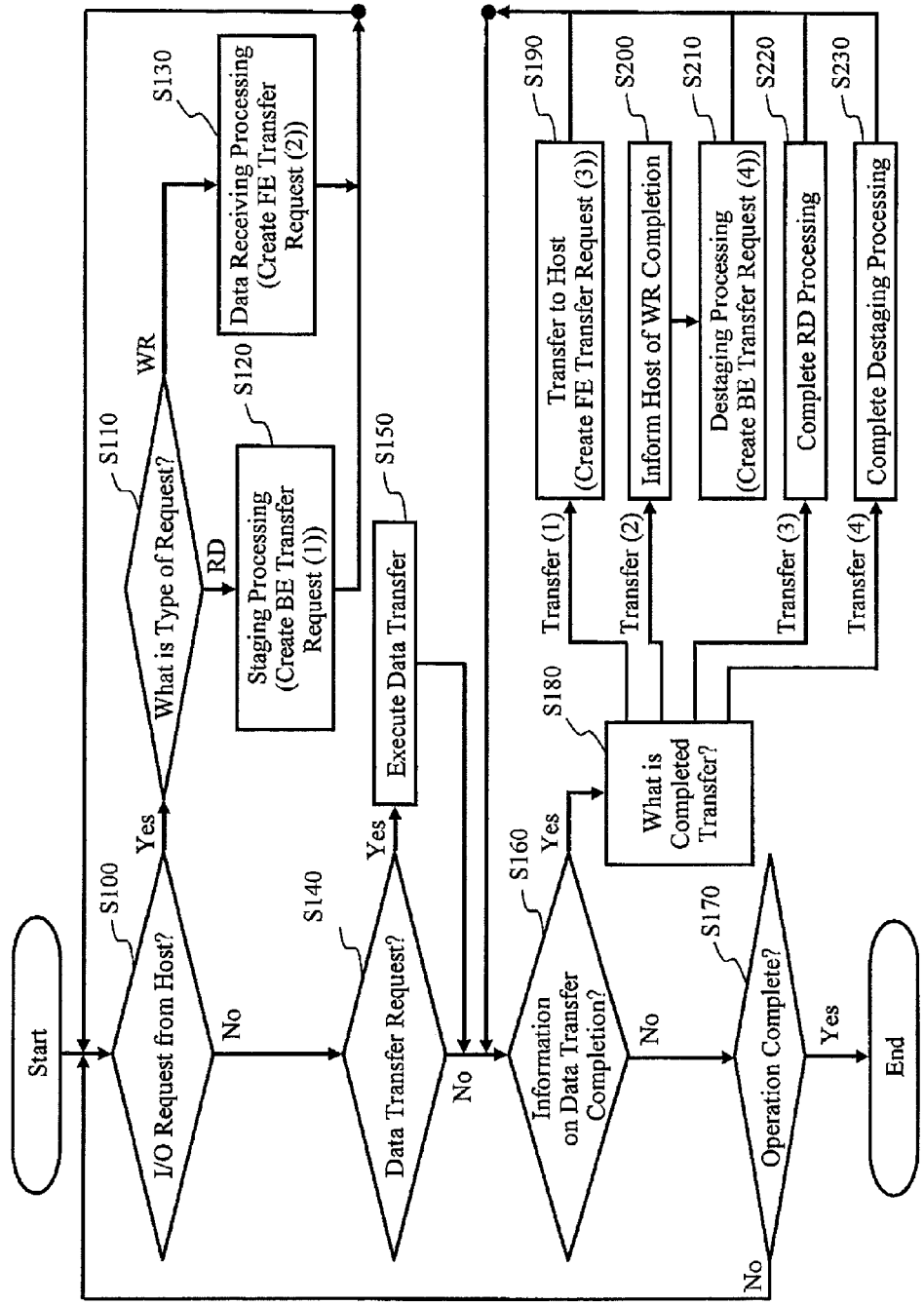
FIG. 15 is an operation flow chart of an I/O processing program executed by a storage controller 100.

FIG. 15 is an operation flow chart of an I/O processing program executed by the storage controller 100. This flow chart illustrates a sequence for executing the read processing and the write processing described with reference to FIG. 14. Hereinafter, each step of FIG. 15 will be described. It should be noted that description will be made first of the read processing, and then of the write processing for the sake of convenience of the description.

Embodiment 1: FIG. 15: Read Processing (FIG. 15: Step S100)

The storage controller 100 determines the presence or absence of an I/O request issued from the host computer 40. If the answer to step S100 is Yes, the flow proceeds to step S110, and if the answer to step S100 is No, the flow proceeds to step S140.

(FIG. 15: Step S110)

The storage controller 100 analyzes the command issued from the host computer 40 and determines whether the type of the request is RD or WR. If the type of the request is determined to be RD, the flow proceeds to step S120, and if the type of the request is determined to be WR, the flow proceeds to step S130. Hereinafter, steps performed when the type of the request is RD will be described.

(FIG. 15: Step S120)

The storage controller 100 creates a data transfer request (a BE transfer request (1)) to execute the staging processing (processing of reading data stored in the flash memory chip 231). Specifically, the storage controller 100 refers to the memory management table 1423 to secure a cache segment in which data read from the flash memory chip 231 is to be stored. Next, the storage controller 100 creates the transfer list 1424. In this case, "BE" is set as the transfer source 14242, "Mem" is set as the transfer destination 14243, and the number of the secured cache segment or the like is set as the cache segment No. 14244. Then, the flow again returns to step S100 so that the storage controller 100 determines the presence or absence of any other I/O requests. Herein, the flow proceeds to step S140 on the assumption that there are no other I/O requests.

(FIG. 15: Step S140)

The storage controller 100 determines the presence or absence of the transfer list 1424 to determine the presence or absence of a data transfer request. If the transfer list 1424 has been created, the storage controller 100 determines a transfer request to be present, and the flow proceeds to step S150. If the transfer list 1424 has not been created, the flow proceeds to step S160.

(FIG. 15: Step S150)

The storage controller 100 executes data transfer processing in accordance with the description of the transfer list 1424. This step will be described in detail with reference to FIG. 16.

(FIG. 15: Step S160)

The storage controller 100 determines the presence or absence of the transfer completion list 1425 to determine if there is any data transfer executed in step S150 that has been completed. If the answer to step S160 is Yes, the flow proceeds to step S180, and if the answer to step S160 is No, the flow proceeds to step S170.

(FIG. 15: Step S170)

If the storage controller 100 continues the operation, the flow returns to step S100 to repeat the same processing, and if the storage controller 100 terminates the operation, the flow ends.

(FIG. 15: Step S180)

The storage controller 100 refers to the transfer list 1424 based on the list No. 14251 whose data transfer processing has been completed as a key, and acquires the values of the transfer source 14242 and the transfer destination 14243. If the transfer source 14242 indicates "BE" and the transfer destination 14243 indicates "Mem," the flow proceeds to step S190, and if the transfer source 14242 indicates "Mem" and the transfer destination 14243 indicates "FE," the flow proceeds to step S220.

(FIG. 15: Step S180: Supplement)

If the transfer source 14242 indicates "BE" and the transfer destination 14243 indicates "Mem," it can be confirmed that the processing of reading data from the flash box 210 into the memory 140 has been completed. In that case, it is further necessary to transfer the data from the memory 140 to the host computer 40. Thus, a data transfer request to that end should be created in step S190. If the transfer source 14242 indicates "Mem" and the transfer destination 14243 indicates "FE," it can be confirmed that the processing of transferring data from the memory 140 to the host computer 40, that is, the read processing has been completed.

(FIG. 15: Step S190)

The storage controller 100 creates as the transfer list 1424 a data transfer request (an PE transfer request (3)) for transferring to the host computer 40 the data that has been read from the flash box 210 into the memory 140 in step S150. Specifically, "Mem" is set as the transfer source 14242 and "FE" is set as the transfer destination 14243 in the transfer list 1424. Then, the flow again returns to step S160 so that the storage controller 100 determines the presence or absence of any other data transfer that has been completed.

(FIG. 15: Step S220)

The storage controller 100 determines that the processing of transferring the data to the host computer 40 is completed. Embodiment 1: FIG. 15: Write Processing (FIG. 15: Steps S100 to S110)

The storage controller 100 executes the same processing as that in steps S100 to S110 described with respect to the read processing. Hereinafter, steps performed when the type of the request is WR will be described.

(FIG. 15: Step S130)

The storage controller 100 creates a data transfer request (an FE transfer request (2)) to execute data receiving processing (processing of receiving the target data to be written from the host computer 40). Specifically, the storage controller 100 refers to the memory management table 1423 to secure a cache segment in which data received from the host computer 40 is to be stored. Then, the storage controller 100 creates the transfer list 1424. In this case, "FE" is set as the transfer source 14242, "Mem" is set as the transfer destination 14243, and the number of the secured cache segment or the like is set as the cache segment No. 14244. Then, the flow again returns to step S100 so that the storage controller 100 determines the presence or absence of any other I/O requests. Herein, the flow proceeds to step S140 on the assumption that there are no other I/O requests.

(FIG. 15: Steps S140 to S170)

These steps are the same as those of the read processing.

(FIG. 15: Step S180)

The storage controller 100 refers to the transfer list 1424 based on the list No. 14251 whose data transfer processing has been completed as a key, and acquires the values of the transfer source 14242 and the transfer destination 14243. If the transfer source 14242 indicates "FE" and the transfer destination 14243 indicates "Mem," the flow proceeds to step S200, and if the transfer source 14242 indicates "Mem" and the transfer destination 14243 indicates "BE," the flow proceeds to step S230.

(FIG. 15: Step S200)

The storage controller 100 informs the host computer 40 of the successful completion of the data writing. Although data is actually written in a subsequent step, the storage controller 100 herein is configured to return a response to the host computer 40 upon reception of the target data to be written in order to promptly return a response to the host computer 40.

(FIG. 15: Step S210)

The storage controller 100 creates as the transfer list 1424 a data transfer request (a BE transfer request (4)) for transferring to the flash box 210 the data that has been received from the host computer 40 and stored into the memory 140 in step S150. Specifically, "Mem" is set as the transfer source 14242 and "BE" is set as the transfer destination 14243 in the transfer list 1424. Then, the flow again returns to step S160 so that the storage controller 100 determines the presence or absence of any other data transfer that has been completed.

(FIG. 15: Step S230)

The storage controller 100 determines that the processing of transferring the data to the flash box 210 has been completed.

Figure 16:
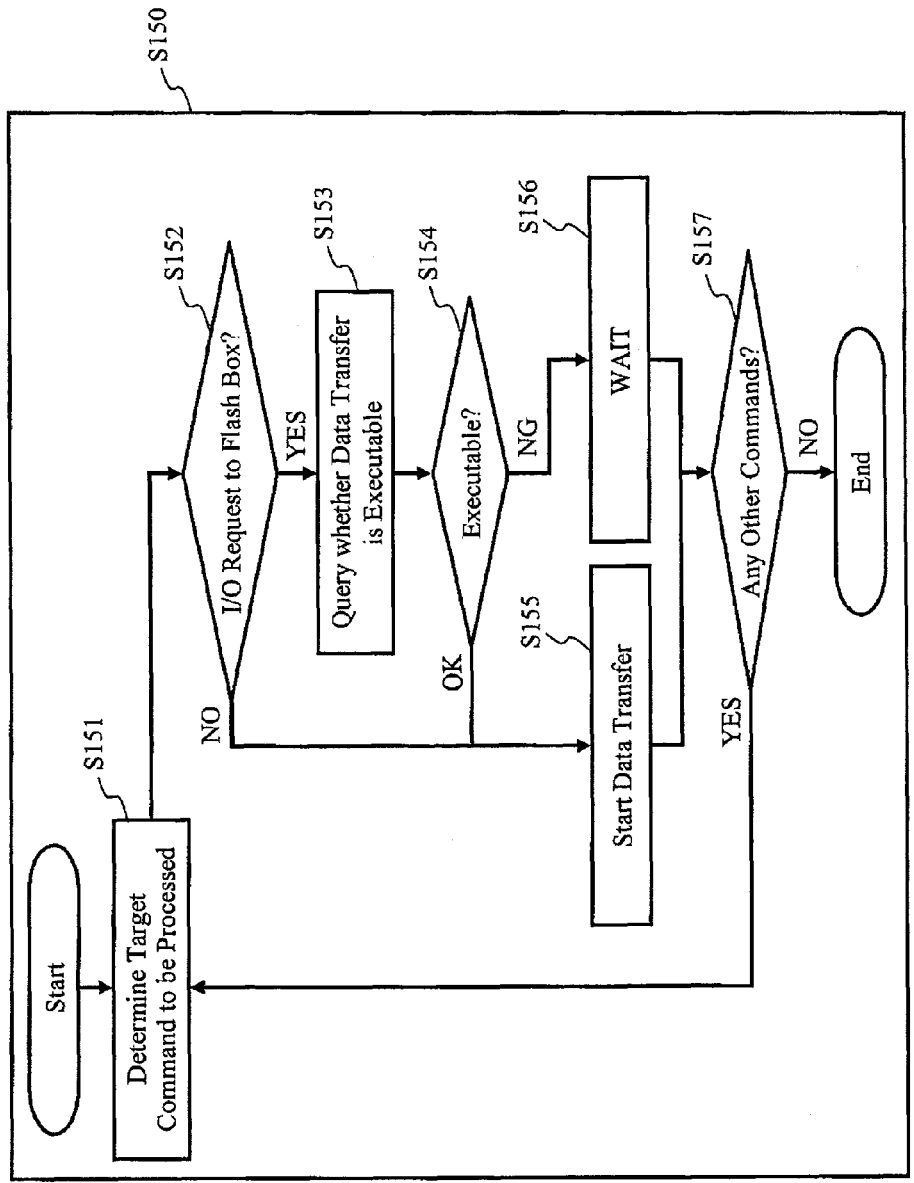
FIG. 16 is a detailed flow chart of step S150 in FIG. 15.

FIG. 16 is a detailed flow chart of step S150 in FIG. 15. Hereinafter, each step of FIG. 16 will be described.

(FIG. 16: Step S151)

The CPU 130 refers to the transfer list 1424 and determines the list No. 14241 with the lowest number to be the target command to be processed.

(FIG. 16: Step S152)

The CPU 130, with reference to the transfer destination 14243, determines whether the command that has been determined to be the target command to be processed in step S151 is an I/O request to the flash box 210. Specifically, the CPU 130 determines "BE" set as the transfer destination 14243 to be an I/O request to the flash box 210. If the answer to step S152 is Yes, the flow proceeds to step S153, and if the answer to step S152 is No, the flow proceeds to step S155.

(FIG. 16: Step S152: Supplement)

A command that is not an I/O request to the flash box 210 is, for example, a data transfer request to the host computer 40.

(FIG. 16: Step S153)

The CPU 130 queries the flash box 210 as to whether data transfer is executable. This step will be described in detail with reference to FIGS. 17 to 19.

(FIG. 16: Step S154)

The CPU 130, in accordance with the reply from the flash box 210, determines whether data transfer is executable. If data transfer is determined to be executable, the flow proceeds to step S155, and if data transfer is determined to be not executable, the flow proceeds to step S156.

(FIG. 16: Step S155)

The CPU 130 sends the transfer list 1424 to the ASICs 150. The ASICs 150 execute the data transfer described in the transfer list 1424 using the function of the DMA transfer unit 151.

(FIG. 16: Step S156)

The CPU 130, if data transfer is determined to be not executable in step S154, determines that write access to the flash box 210 cannot be executed promptly. Thus, the CPU 130 waits for a predetermined period of time without starting data transfer. With regard to data that is not transferred in this step, the CPU 130 will attempt to transfer such data when the present flow is executed again.

(FIG. 16: Step S157)

The CPU 130, with reference to the transfer list 1424, determines the presence or absence of any other transfer requests that have not been executed yet. If the answer to step S157 is Yes, the flow returns to step S151, and if the answer to step S157 is No, the flow ends.

Figure 17:
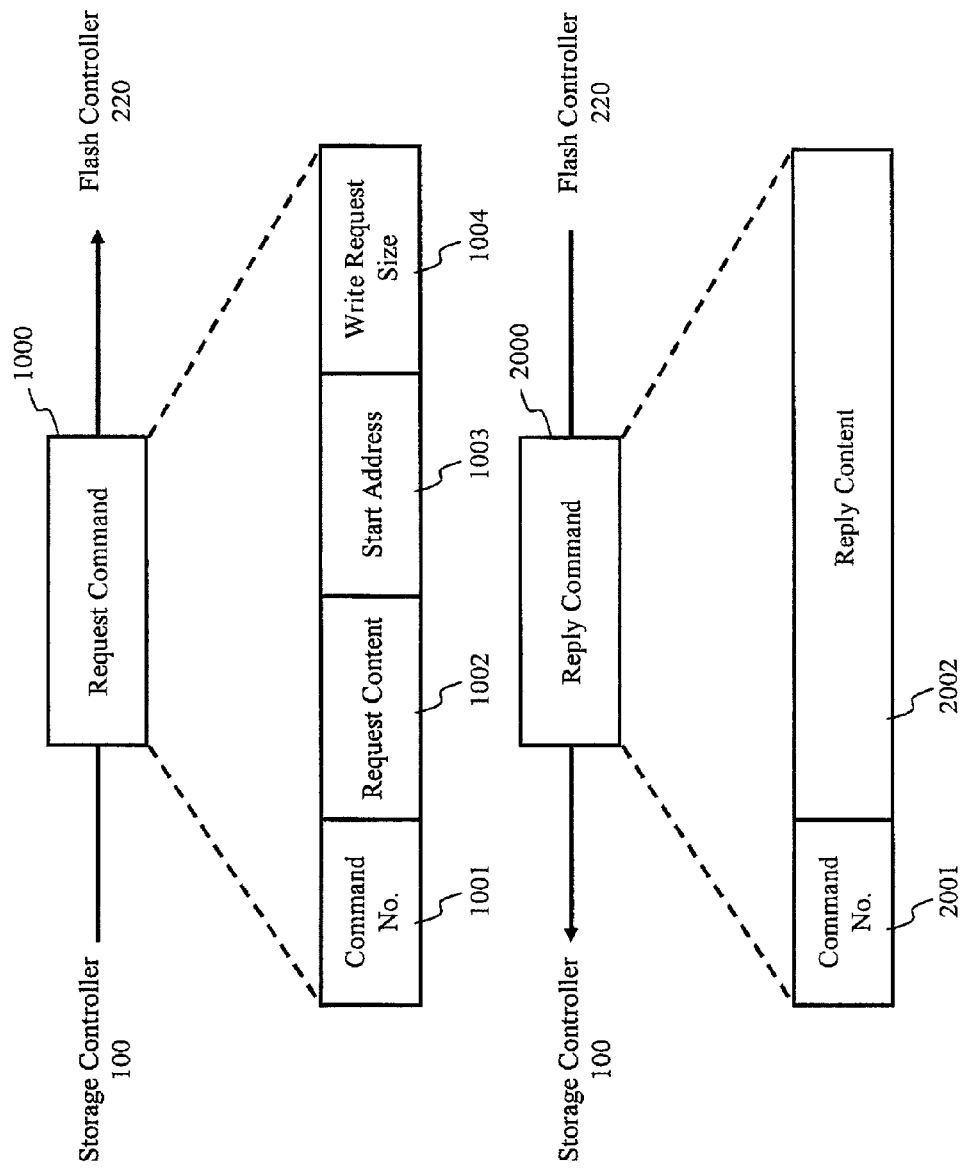
FIG. 17 is a structure diagram of a request command 1000 and a reply command 2000 transferred between the storage controller 100 and a flash controller 220.

FIG. 17 is a structure diagram of a request command 1000 and a reply command 2000 exchanged between the storage controller 100 and the flash controller 220 in step S153. Hereinafter, the structure of each command will be described.

The request command 1000 is a command sent from the storage controller 100 to the flash controller 220, and includes a command No. 1001 and request content 1002. Depending on the type of the request content 1002, the request command 1000 may further include additional information. Hereinafter, an example will be described in which the storage controller 100 queries the flash controller 220 as to whether data write access to the flash memory chip 231 is allowed. In that case, the request command 1000 further includes a start address 1003 and write request size 1004.

As the command No. 1001, the value of the list No. 14241 of the transfer list 1424 that is currently processed by the ASICs 150 is set. As the request content 1002, a value indicating a command that causes the request command 1000 to query as to whether data transfer is executable is set. The value of the LBA 14247 is set as the start address 1003, and the value of the length 14245 is set as the write request size 1004.

The reply command 2000 is a command sent from the flash controller 220 to the storage controller 100, and includes information to be returned in response to the request command 1000. Specifically, the reply command 2000 includes a command No. 2001 and reply content 2002.

As the command No. 2001, the value of the command No. 1001 that has been set for the corresponding request command 1000 is set. As the reply content 2002, a value indicating a reply content of the reply command 2000 is set. For example, if the request command 1000 is a command that queries as to whether data transfer is executable, a value indicating that data transfer is executable or not is set as the reply content 2002.

The configurations of the commands are not limited to the examples shown in FIG. 17. In addition, the flash controller 220 can be configured to send the request command 1000 to the storage controller 100, and the storage controller 100 can be configured to send the reply command 2000 to the flash controller 220.

Figure 18:
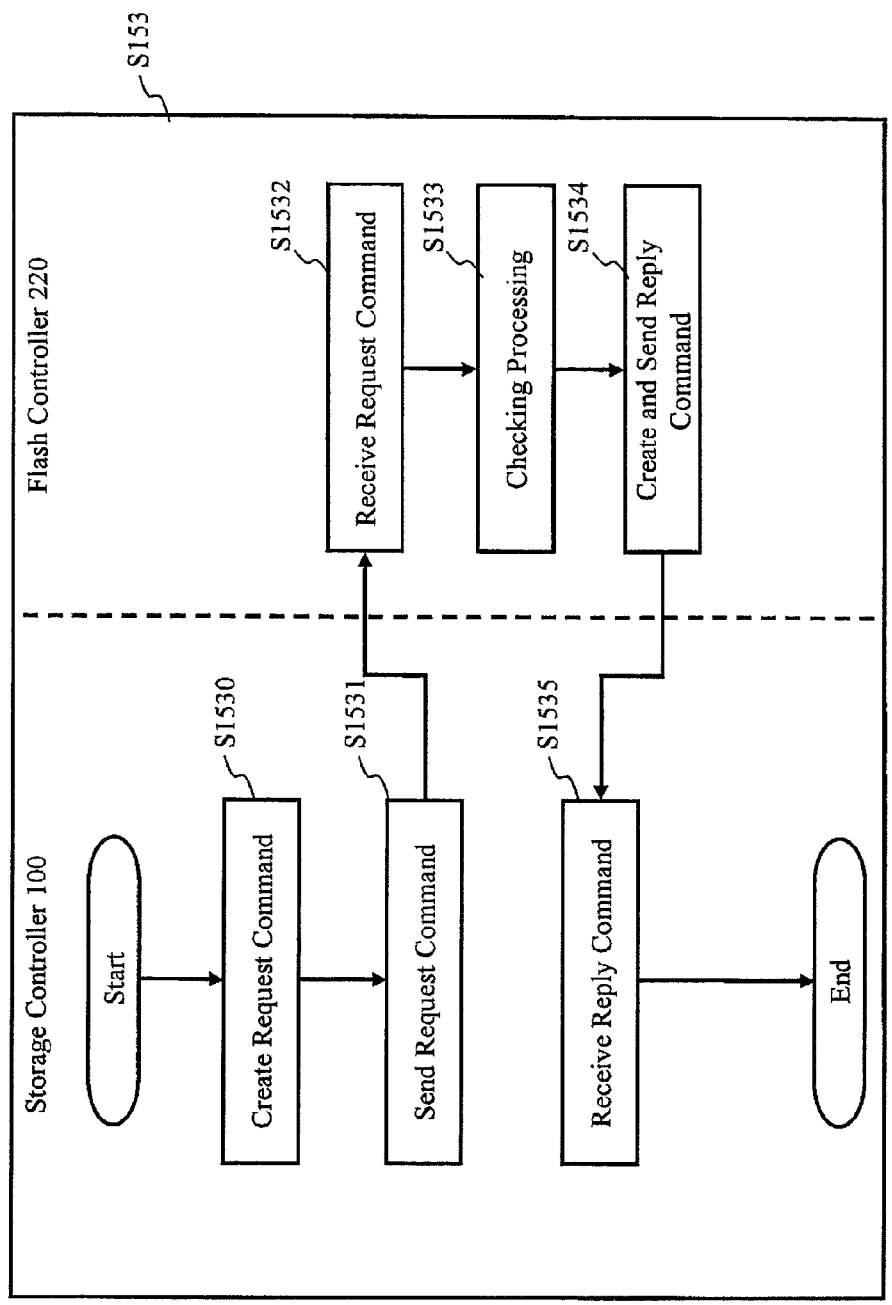
FIG. 18 is a flow chart showing the details of step S153.

FIG. 18 is a flow chart showing the details of step S153. Hereinafter, each step of FIG. 18 will be described.

(FIG. 18: Step S1530)

The storage controller 100 creates the request command 1000. As described with reference to FIG. 17, the content of the transfer list 1424 that is currently processed by the ASICs 150 is set as each item of the request command 1000.

(FIG. 18: Step S1531)

The storage controller 100 sends the created request command 1000 to the flash controller 220.

(FIG. 18: Step S1532)

The flash controller 220 receives the request command 1000.

(FIG. 18: Step S1533)

The flash controller 220 checks the content of the request command 1000. This step will be described in detail with reference to FIG. 19.

(FIG. 18: Step S1534)

The flash controller 220, based on the result of step S1533, creates the reply command 2000 and sends it to the storage controller 100.

(FIG. 18: Step S1535)

The storage controller 100 receives the reply command 2000 and checks the content, and then terminates the present flow.

Figure 19:
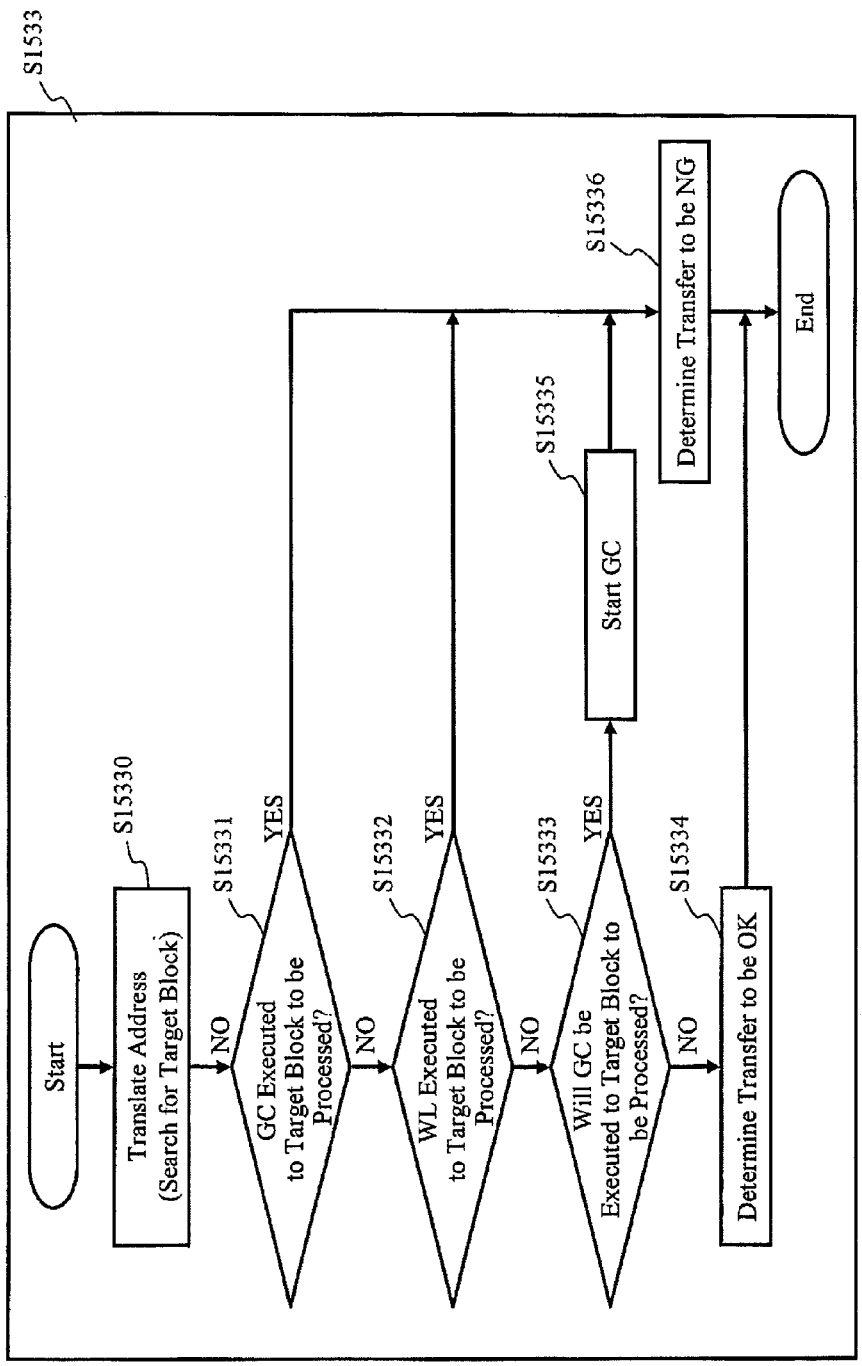
FIG. 19 is a detailed flow chart of step S1533.

FIG. 19 is a detailed flow chart of step S1533. Hereinafter, each step of FIG. 19 will be described.

(FIG. 19: Step S15330)

The flash controller 220 refers to the address management table 22422 to search for the chip No. 224222 and the block No. 224223 in which data specified by the request command 1000 is stored.

(FIG. 19: Step S15331)

The flash controller 220 refers to the status information 224234 in the block management table 22423, and determines whether GC is currently executed to the relevant block 232. If the answer to step S15331 is Yes, the flow proceeds to step S15336, and if the answer to step S15331 is No, the flow proceeds to step S15332.

(FIG. 19: Step S15332)

The flash controller 220 refers to the status information 224234 in the block management table 22423, and determines whether WL is currently executed to the relevant block. If the answer to step S15332 is Yes, the flow proceeds to step S15336, and if the answer to step S15332 is No, the flow proceeds to step S15333.

(FIG. 19: Step S15333)

The flash controller 220 determines whether GC will be executed to the block for which the data transfer request has been received. Specifically, the flash controller 220 determines from the write request size 1004 included in the request command 1000 how many pages 233 in the update area would be necessary to store the data. If the number of the necessary pages 233 is determined to be insufficient, the flash controller 220 determines that GC will be executed, and if not, the flash controller 220 determines that GC will not be executed. If the answer to step S15333 is Yes, the flow proceeds to step S15335, and if the answer to step S15333 is No, the flow proceeds to step S15334.

(FIG. 19: Step S15333: Supplement)

Examples of the determination methods in the present step include a method of calculating the number of necessary pages by dividing the write request size by the size of the page 233. In that case, the flash controller 220, if the quotient is greater than the residual number of valid pages 224235 of the block, determines that GC will be executed, and if the quotient is less than or equal to the residual number of valid pages 224235 of the block, determines that GC will not be executed.

(FIG. 19: Step S15334)

The flash controller 220 determines the data transfer to be executable and terminates the present flow.

(FIG. 19: Step S15335)

The flash controller 220 starts execution of GC to the relevant block.

(FIG. 19: Step S15336)

The flash controller 220 determines the data transfer to be non-executable, and terminates the present flow.

Figure 20:
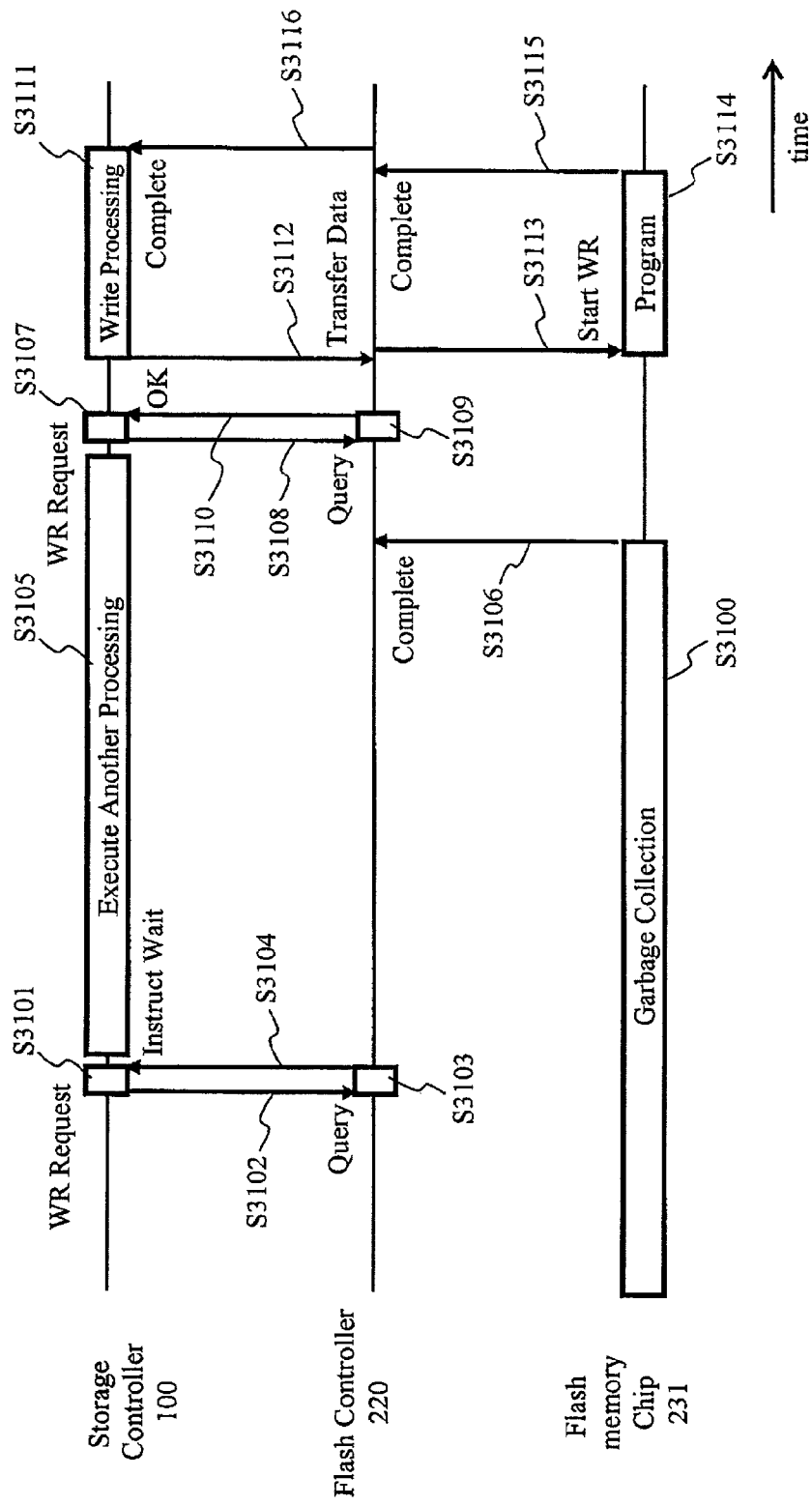
FIG. 20 is a diagram showing a schematic sequence in which the storage controller 100 accesses the flash memory chip 231 in Embodiment 1.

FIG. 20 is a diagram showing a schematic sequence in which the storage controller 100 accesses the flash memory chip 231 in Embodiment 1. Hereinafter, each step of FIG. 20 will be described.

(FIG. 20: Step S3100)

It is assumed that the flash controller 220 is executing GC to the flash memory chip 231.

(FIG. 20: Steps S3101 to S3102)

The storage controller 100 starts the processing of querying the flash controller 220 as to whether data write access to the flash memory chip 231 is allowed. At this time, the storage controller 100 sends to the flash controller 220 the request command 1000 to query as to whether data write access to the flash memory chip 231 is allowed.

(FIG. 20: Steps S3103 to S3104)

During these steps, the flash controller 220 is executing GC to the flash memory chip 231. Thus, the flash controller 220 sends to the storage controller 100 the reply command 2000 indicating that data write access to the flash memory chip 231 is not allowed.

(FIG. 20: Step S3105)

The storage controller 100 suspends the data write processing to the flash memory chip 231 and executes another processing while waiting. The wait time herein can be either fixed or determined as needed.

(FIG. 20: Step S3106)

The flash controller 220, after the completion of the GC, enters a state ready to receive a request to write data to the flash memory chip 231.

(FIG. 20: Steps S3107 to S3108)

The storage controller 100 restarts the data write processing that has been suspended in step S3105, and executes the same processing as that in steps S3101 to S3102.

(FIG. 20: Steps S3109 to S3110)

The flash controller 220 sends the reply command 2000 to the storage controller 100 as in steps S3103 to S3104. Herein, as the GC has been completed, the flash controller 220 sends the reply command 2000 indicating that data write access to the flash memory chip 231 is allowed.

(FIG. 20: Steps S3111 to S3112)

The storage controller 100 starts the data write processing to the flash memory chip 231. At this time, the storage controller 100 sends to the flash controller 220 the request command 1000 to write data to the flash memory chip 231.

(FIG. 20: Steps S3113 to S3116)

The flash controller 220 executes data writing to the flash memory chip 231. Upon completion of the data writing, the flash controller 220 sends to the storage controller 100 the reply command 2000 indicating the completion of the data writing. The storage controller 100, upon receipt of the reply command 2000, terminates the data write processing.

According to the sequence of FIG. 20, the storage controller 100 and the flash controller 220 operate cooperatively, whereby the time required for the storage controller 100 to execute destaging can be minimized. Specifically, the time required for the storage controller 100 to execute destaging can be made substantially equal to the time in which data is actually written to the flash memory chip 231. Accordingly, the time in which the storage controller 100 can execute another processing (step S3105) can be increased with the result that the entire performance of the storage system 10000 can be improved.

As described above, according to Embodiment 1, the storage controller 100, before writing data to the flash memory chip 231, queries the flash controller 220 as to whether data write access to the flash memory chip 231 is allowed using the request command 1000. Accordingly, the storage controller 100 can actually start data writing after the flash memory chip 231 becomes write-accessible, and thus the substantial data write time can be suppressed.

In addition, according to Embodiment 1, the storage controller 100, if it has received the reply command 2000 indicating that data write access to the flash memory chip 231 is not allowed, starts another processing. Accordingly, it becomes possible for the storage controller 100 to continue the processing without wasting the time in which the data write access to the flash memory chip 231 is not allowed, whereby the performance of the storage device 10 can be improved.

Further, according to Embodiment 1, the storage controller 100, having completed another processing after the receipt of the reply command 2000 indicating that data write access to the flash memory chip 231 is not allowed, again queries the flash controller 220 as to whether data write access to the flash memory chip 231 is allowed. Accordingly, even if data write access to the flash memory chip 231 is not allowed at a given moment in time, data writing can successfully be completed without being abandoned.

In Embodiment 1, description has been made of an example in which the storage controller 100 queries the flash controller 220 as to whether data write access to the flash memory chip 231 is allowed. However, it is also possible to configure the storage controller 100 to query as to whether data read access to the flash memory chip 231 is allowed. Accordingly, the storage controller 100, during execution of GC, can execute another processing without issuing a data read request, and can, after the completion of the GC, read the data from the flash memory chip 231.

In Embodiment 1, the flash controller 220 can be configured to execute GC not only when it has received an access request from the storage controller 100 but also at any given time as needed. This is also true of the following embodiments.

In Embodiment 1, when the flash controller 220 sends to the storage controller 100 the reply command 2000 indicating that the flash memory chip 231 is inaccessible, information on the wait time can be included in the reply command 2000. The storage controller 100, after having waited for the wait time described in the reply command 2000, retries data writing. The wait time herein depends on the time required for the flash controller 220 to execute GC. Thus, a value indicating an appropriate wait time can be stored in advance in a storage device such as the memory 224 in accordance with the performance of each device so that the flash controller 220 will read such value and inform the storage controller 100 of the value. Alternatively, a value indicating a wait time can be embedded in a program executed by the flash controller 220.

Embodiment 2

In Embodiment 2 of the present invention, an operation example will be described in which GC is executed in advance before the storage controller 100 issues a data write request to the flash controller 220. Configurations other than that are the same as those described in Embodiment 1.

Figure 21:
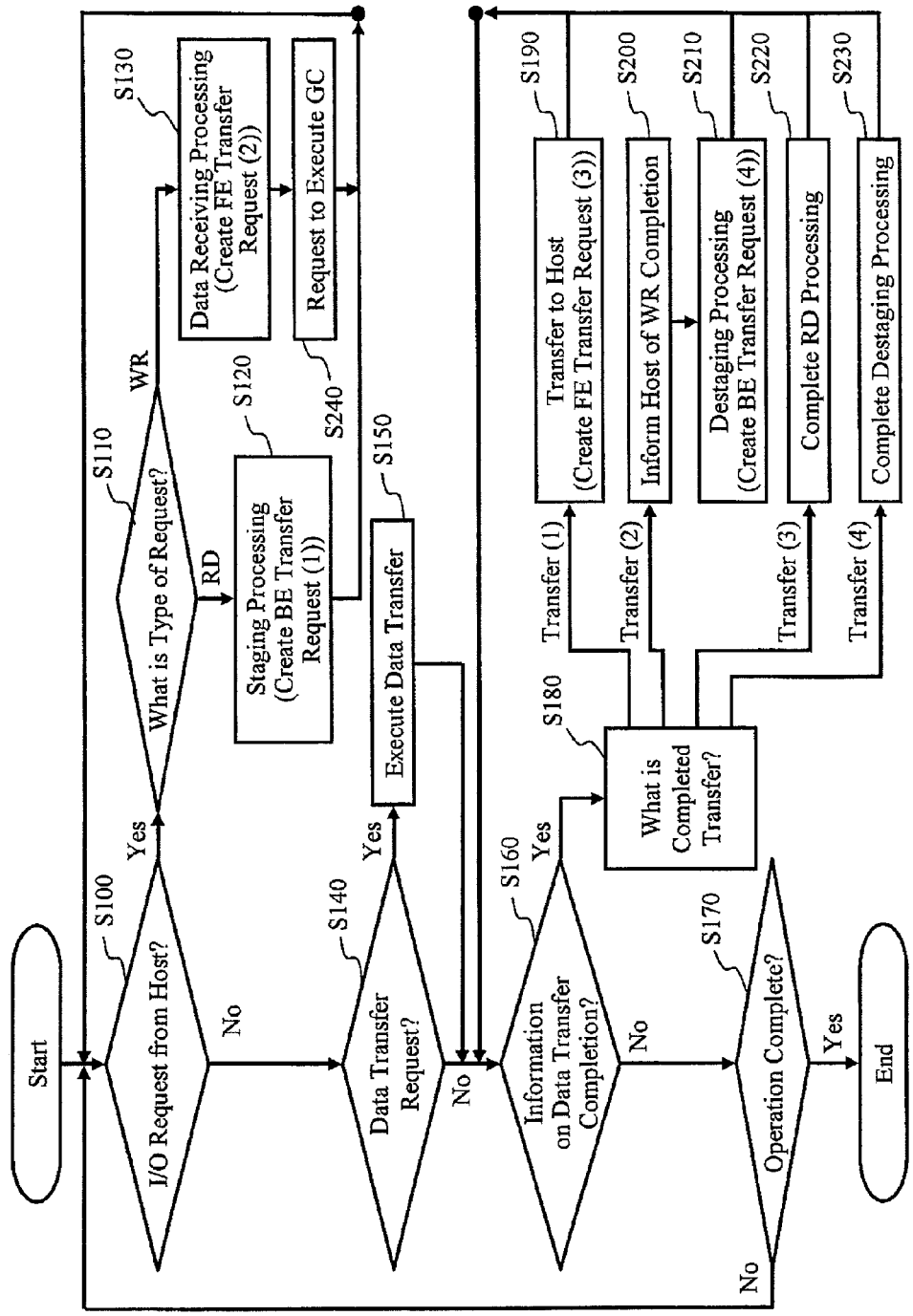
FIG. 21 is an operation flow chart of an I/O processing program executed by the storage controller 100 in Embodiment 2.

FIG. 21 is an operation flow chart of an I/O processing program executed by the storage controller 100 in Embodiment 2. This flow differs from that in FIG. 15 in that, in addition to the flow described with reference to FIG. 15, step S240 is provided after step S130. Steps other than that are the same as those in FIG. 15.

Figure 22:
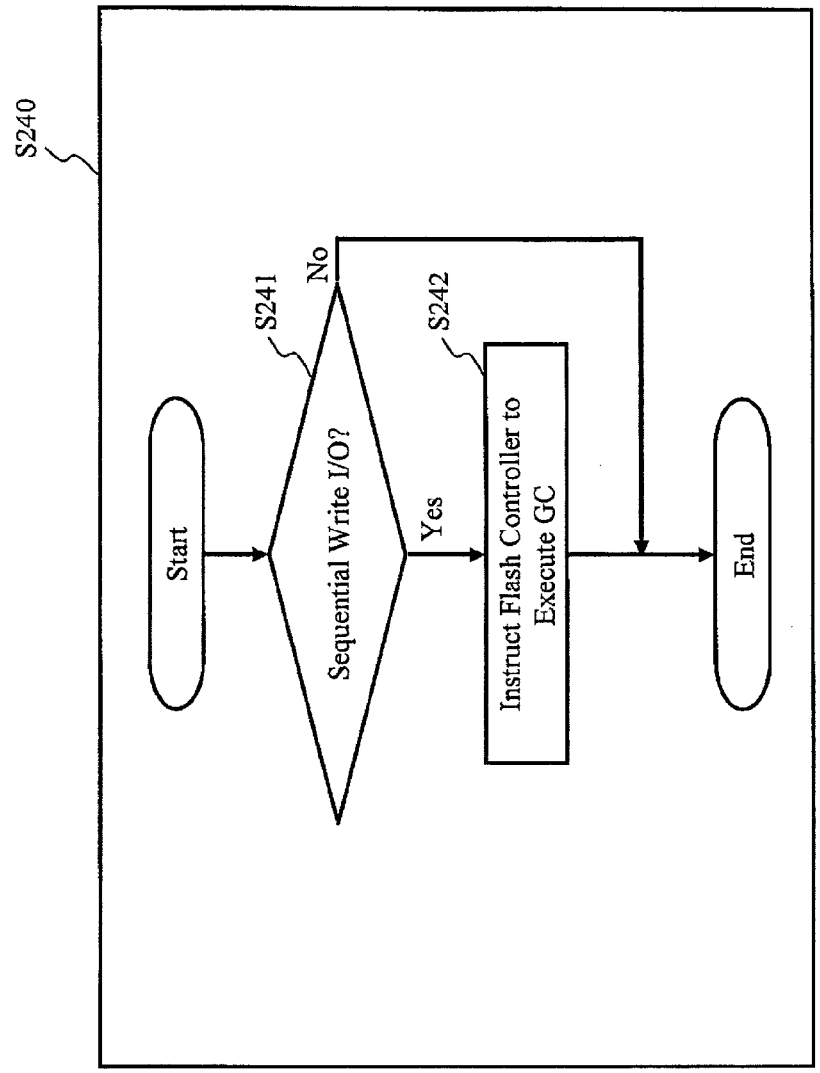
FIG. 22 shows a detailed flow of step S240.

FIG. 22 shows a detailed flow of step S240. Hereinafter, each step of FIG. 22 will be described.

(FIG. 22: Step S241)

The storage controller 100 determines whether the currently processed I/O request is a sequential write request. If the answer to step S241 is Yes, the flow proceeds to step S242, and if the answer to step S241 is No, the flow ends.

(FIG. 22: Step S241: Supplement 1)

The reason for determining whether the I/O request is a sequential write request in this step is that sequential write commands are typically write commands that are executed in writing large-size data.

(FIG. 22: Step S241: Supplement 2)

Among methods of determining if an I/O request is a sequential write request is a method of determining if addresses of data to be written are consecutive. Specifically, the storage controller 100, with reference to the memory management table 1423, determines whether data, which has an immediately preceding address of the address (LBA) contained in the I/O request received from the host computer 40, resides in the memory 140. If such data is determined to reside in the memory 140, the storage controller 100 determines the relevant I/O request to be a sequential write request.

(FIG. 22: Step S242)

The storage controller 100 creates the request command 1000 to execute GC, and sends it to the flash controller 220.

Figure 23:
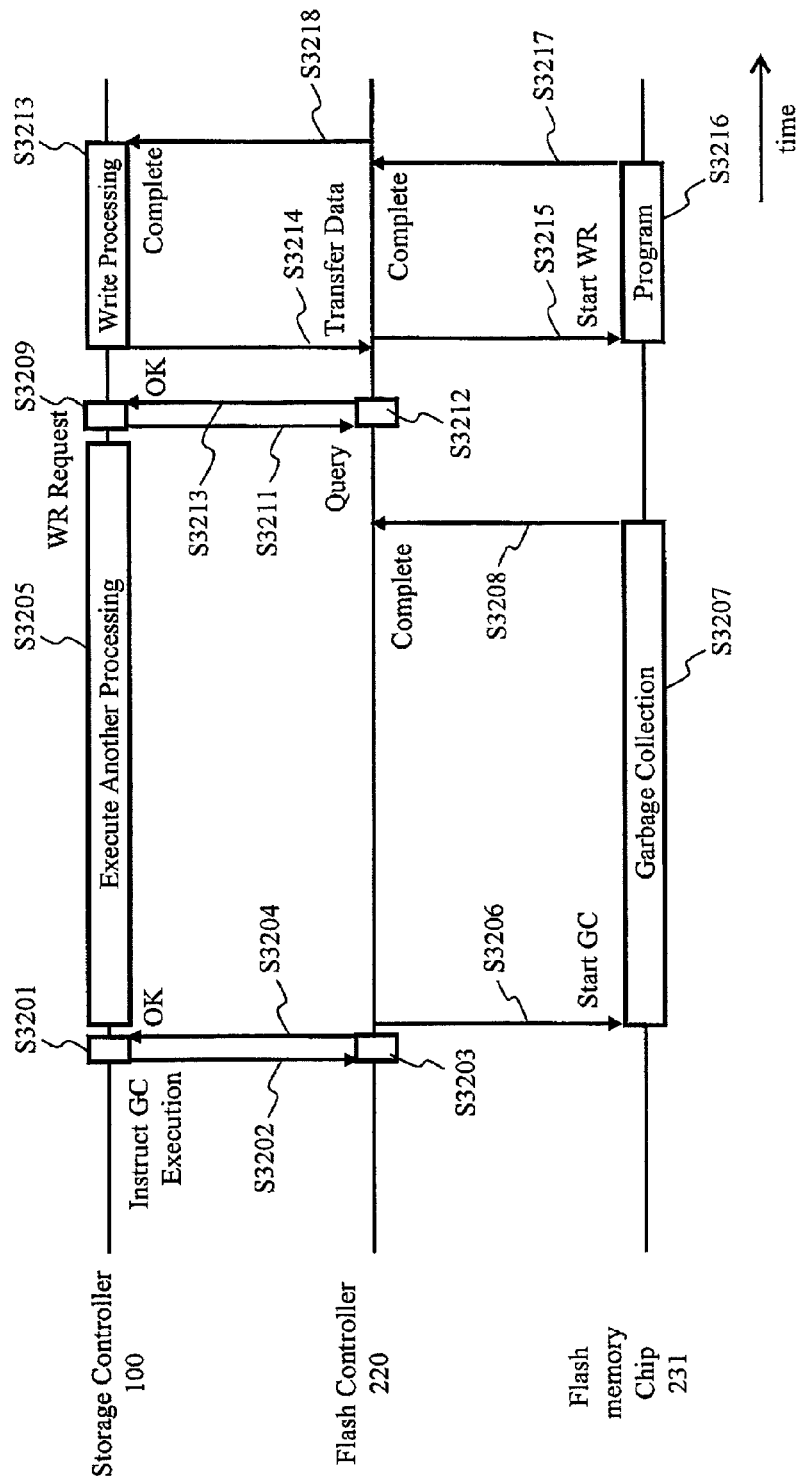
FIG. 23 is a diagram showing a schematic sequence in which the storage controller 100 accesses the flash memory chip 231 in Embodiment 2.

FIG. 23 is a diagram showing a schematic sequence in which the storage controller 100 accesses the flash memory chip 231 in Embodiment 2. Hereinafter, each step of FIG. 23 will be described.

(FIG. 23: Steps S3201 to S3205)

It is assumed that the storage controller 100 has received a sequential write request from the host computer 40. The storage controller 100 sends the request command 1000 to start execution of GC to the flash controller 220. Then, the storage controller 100 suspends the data write processing to the flash memory chip 231 and executes another processing while waiting.

(FIG. 23: Steps S3206 to S3208)

The flash controller 220 executes GC to the flash memory chip 231. Upon completion of the GC, the flash controller 220 enters a state ready to receive a request to write data to the flash memory chip 231.

(FIG. 23: Steps S3209 to S3218)

These steps are the same as steps S3107 to S3116 in FIG. 20

According to the sequence of FIG. 23, the storage controller 100, before starting destaging processing to the flash controller 220, requests the flash controller 220 to start GC. Accordingly, sufficient empty pages can be created in the flash memory chip 231 before data writing is actually started. Thus, even when processing of destaging large-size data is subsequently generated along with a sequential write request, the flash controller 220 can promptly store such data without executing GC to the flash memory chip 231.

In Embodiment 2, the storage controller 100 is configured to, upon receipt of a sequential write request from the host computer 40, determine that processing of writing large-size data will be generated. However, if it is possible to know in advance that the size of data to be written is large through the use of other means, the storage controller 100 need not necessarily determine the necessity of the execution of GC based on whether a received I/O request is a sequential write request or not. For example, if the storage controller 100 is informed of a data size together with a data write request from the host computer 40, it can determine the necessity of the execution of GC based on the data size.

In addition, in Embodiment 2, the storage controller 100 is configured to issue the request command 1000 to execute GC in advance to the flash controller 220. Alternatively, the storage controller 100 can be configured to send a data write request directly to the flash controller 220 so that the flash controller 220 determines the necessity of the execution of GC. In that case, the flash controller 220, in order to execute GC, sends to the storage controller 100 the reply command 2000 indicating that data write access is not allowed, and starts the GC. The subsequent operations are the same as those in Embodiment 2.

Embodiment 3

In Embodiment 2, description has been made of an example in which GC is executed in advance before the storage controller 100 writes data to the flash memory chip 231. In order to execute GC, there should be empty alternate blocks 237 available in order that data in the flash memory chip 231 can be once saved to the alternate blocks 237.

However, if all of the alternate blocks 237 have already been used for WL, GC, or the like for the other blocks 232, a shortage of the alternate blocks 237 could occur, and thus GC or WL cannot newly be executed. In that case, even if GC is attempted to be executed in advance before large-size data is written as described in Embodiment 2, it would be impossible, unless WL or GC for the other blocks 232 is completed and a new alternate block 237 is thus produced, to execute the GC to the relevant block.

Thus, in Embodiment 3 of the present invention, when an area of the flash memory chip 231 that has been used so far becomes no longer used, for example, at the timing when an LU is deleted, the storage controller 100 instructs the flash controller 220 to free the unused area. Accordingly, alternate blocks 237 that are available in the flash memory chip 231 can be secured.

In the conventional storage devices, a storage controller frees an LU that is a logical address space at the time of deleting the LU, but does not execute the processing of freeing a physical area like the format processing performed to HDDs. That is, a storage area appears to be freed when an LU is deleted, but in reality, data keeps on residing in the physical area.

In the storage device with the flash memory chips 231, in order to rewrite the page 233 to which data has once been written, it is necessary that the data written in the page 233 be physically deleted. Therefore, when the storage controller 100 deletes only an LU, a storage area is not actually freed. Thus, the number of available alternate blocks 237 would gradually run short, whereby the aforementioned problem could occur. Embodiment 3 aims to address such a problem.

Figure 24:
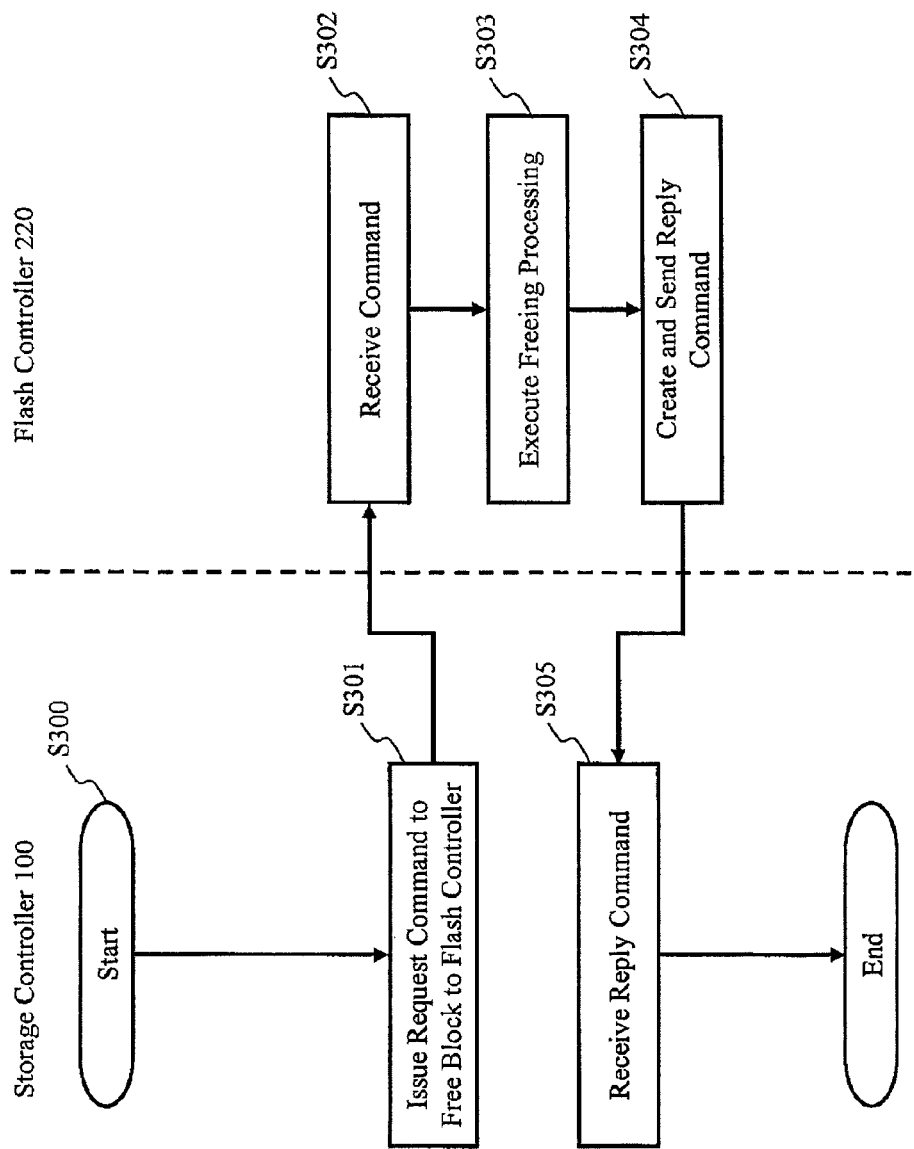
FIG. 24 is a flow chart showing the processing in which the storage controller 100 requests the flash controller 220 to free a block 232.

FIG. 24 is a flow chart showing the processing in which the storage controller 100, after deleting an LU, requests the flash controller 220 to free the block 232. Hereinafter, each step of FIG. 24 will be described.

(FIG. 24: Step S300)

The storage controller 100 executes the present processing flow during or after the processing of deleting an LU.

(FIG. 24: Step S301)

The storage controller 100 issues the request command 1000 to request the flash controller 220 to free the block 232 that has been assigned to the deleted LU. For each parameter of the request command 1000, the start LBA, the last LBA, or the like of the area to be freed is set. Such a range to be freed can be identified by referring to the start LBA 14223 and the last LBA 14224 of the deleted LU on the LU management table 1422.

(FIG. 24: Step S302)

The flash controller 220 receives the request command 1000.

(FIG. 24: Step S303)

The flash controller 220 frees the requested block 232 in accordance with the content of the request command 1000. Specifically, the flash controller 220 identifies the block 232 to be freed with reference to the address management table 22422, and issues an erase command to the block 232. In addition, the flash controller 220 changes the attribute 224233 of the block in the block management table 22423 to "Alternate."

(FIG. 24: Step S304)

The flash controller 220 creates the reply command 2000 to inform the storage controller 100 of the completion of the processing of freeing the block 232, and sends it to the storage controller 100.

(FIG. 24: Step S305)

The storage controller 100 receives the reply command 2000 from the flash controller 220, and terminates the present processing flow.

As described above, according to Embodiment 3, the processing of freeing a storage area of the flash memory chip 231 is executed at the point when the storage controller 100 has deleted an LU. Accordingly, it is possible to reduce the possibility that a shortage of the alternate blocks 237 may occur when the flash controller 220 attempts to execute GC, in which case the GC cannot be executed. In particular, the frequency of execution of GC will increase under the operating conditions that GC is executed in advance before large-size data is written as described in Embodiment 2. In such a case, the advantageous effect of the method described in Embodiment 3 can be maximized.

Embodiment 4

In Embodiment 4 of the present invention, a method of securing available alternate blocks 237 when the storage device 10 uses a volume virtualization technique will be described. The reason that the available alternate blocks 237 should be secured is the same as that described in Embodiment 3.

The volume virtualization technique is a technique of presenting a virtual volume, which is larger than the physical volume, of the storage device 10 to the host computer 40 in advance, and adding a storage capacity only after the virtual volume is actually needed. JP Patent Publication (Kokai) No. 2007-66259 A discloses an example of a storage device that uses a volume virtualization technique.

In Embodiment 4, a storage area that is assigned when data is written on the storage device 10 with a virtualized storage capacity is referred to as a "segment" in the present invention. JP Patent Publication (Kokai) No. 2007-66259 A discloses, as a means of improving the performance of a storage device that uses a volume virtualization technique, migrating a segment (the term "segment" is also used in this document) from one storage device to another.

When a segment is migrated from one storage device to another, data in the migration-source segment is not physically freed. Thus, freeing the block 232 that constitutes the migration-source segment as in Embodiment 3 will allow the number of the available alternate blocks 237 in the flash memory chip 231 to be increased.

Figure 25:
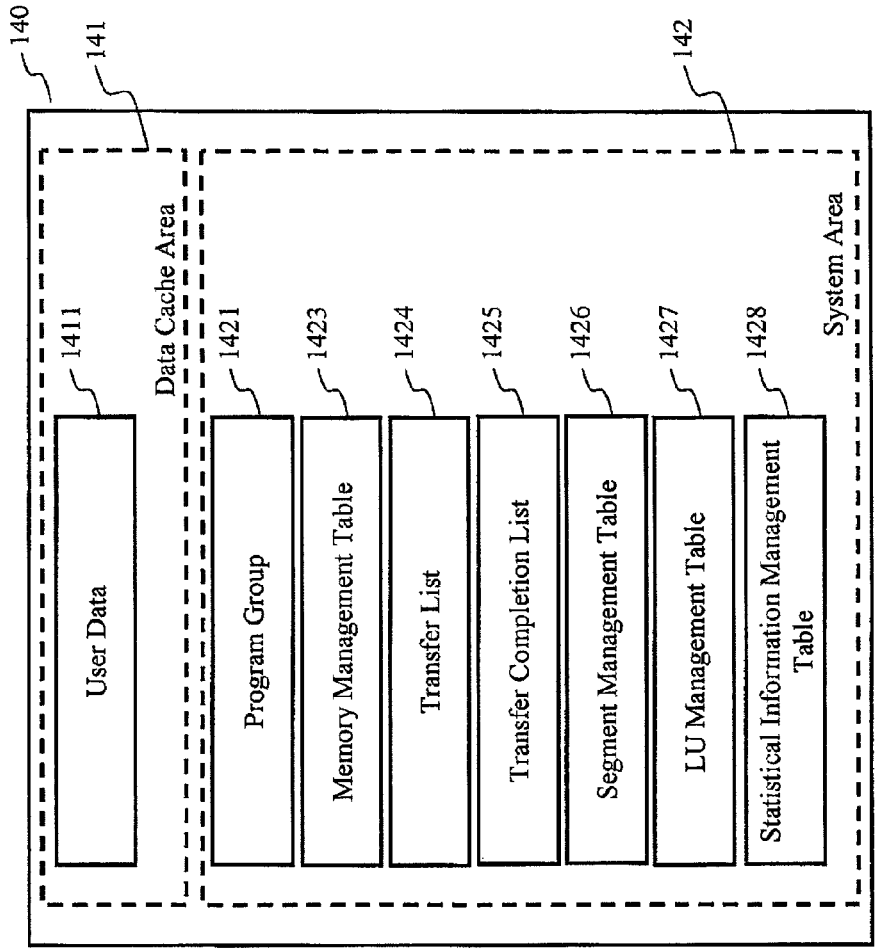
FIG. 25 is a structure diagram of the memory 140 in accordance with Embodiment 4.

FIG. 25 is a structure diagram of the memory 140 in accordance with Embodiment 4. This structure differs from that described with reference to FIG. 3 in Embodiment 1 in that a segment management table 1426, an LU management table 1427, and a statistical information management table 1428 are newly provided instead of the LU management table 1422. Structures other than that of the memory 140 are the same as those in Embodiments 1 to 3.

The segment management table 1426 manages the structures of segments. The LU management table 1427 manages the structures of LUs. The statistical information management table 1428 has recorded thereon the statistical information such as the number of commands issued to each segment.

FIG. 26 is a structure diagram of the segment management table 1426. The segment management table 1426 contains a segment No. 14261, flash box No. 14262, start LBA 14263, and last LBA 14264.

The segment No. 14261 is the identifier of a created segment. The flash box No. 14262 is the identification number of the flash box 210 in which the segment is created. The start LBA 14263 and the last LBA 14264 indicate the location of the segment's address space in the flash box 210, that is, each of the start address and the end address of the segment is indicated by an LBA.

FIG. 27 is a structure diagram of the LU management table 1427. The LU management table 1427 is provided in a number corresponding to the number of created LUs. The LU management table 1427 contains a LUN 14271, LU size 14272, and segment No. 14273.

The LUN 14271 is the identifier of an LU. The LU size 14272 indicates the size of the LU in units of GB (GigaByte). The segment No. 14273 indicates the identification number of a segment assigned to the LU, and is provided in a number corresponding to the LU size.

In the volume virtualization technique, a virtual logical unit that is a physical storage area is assigned only after data is actually stored. Therefore, in the segment No. 14273, "n/a" that indicates "not assigned" is set for an area that is not assigned a segment, whereas for an area that has been assigned a segment, the identification number of the segment is set.

FIG. 28 is a structure diagram of the statistical information management table 1428. The statistical information management table 1428 contains a segment No. 14281, the number of write commands 14282, and the number of read commands 14283.

The segment No. 14281 is the identifier of a segment. The number of write commands 14282 and the number of read commands 14283 indicate the number of write I/O requests and the number of read I/O requests, respectively, that have been issued to the segment from the host computer 40.

The storage controller 100, after migrating a segment or deleting an LU, requests the flash controller 220 to free the block 232 corresponding to the segment. This step is the same as that shown in FIG. 24, but differs in the method of identifying the target block 232 to be freed.

When migrating a segment, the storage controller 100 identifies from the segment management table 1426 the start LBA 14263 and the last LBA 14264 of the segment, based on the segment No. 14261 of the migration source as a key.

When deleting an LU, the storage controller 100 first refers to the LU management table 1427 based on the LUN 14271 as a key, and identifies the segment No. 14273 that constitutes the deleted LU. Next, the storage controller 100 refers to the segment management table 1426 based on the segment No. as a key, and identifies the start LBA 14263 and the last LBA 14264 of the segment.

As described above, according to Embodiment 4, the processing of freeing a storage area of the flash memory chip 231 is executed at the point when the storage controller 100 has migrated a segment or deleted an LU. Accordingly, even when the storage device 10 employs a volume virtualization technique, an advantageous effect similar to that in Embodiment 3 can be exerted.

It should be noted that in Embodiment 4, even when the storage controller 100 has deleted a segment, a storage area of the flash memory chip 231 can be freed in a similar way.

Embodiment 5

In Embodiment 5 of the present invention, a method of evenly distributing the frequency of write I/O access or the number of data erasure cycles across each of the plurality of flash boxes 210 will be described. Although the configuration of Embodiment 5 is based on the configuration described in Embodiment 4 that uses a volume virtualization technique, a similar method can also be used under the configuration described in any of Embodiments 1 to 3.

When only a particular flash box 210 is write I/O accessed with high frequency, the frequency of GC or WL executed to the flash box 210 would correspondingly increase, and thus the number of erasure cycles of such a flash memory chip 231 would also increase. However, as the flash memory chip 231 is a device with a finite number of erasure cycles, if the erasure cycles of a particular block 232 have exceeded a threshold limit, resulting in a crash, such a crashed block 232 is replaced with the alternate block 237. Thus, the number of the available alternate blocks 237 in the flash box 210 that is write I/O accessed with high frequency would easily decrease. The resulting shortage of the available alternate blocks 237 can lead to a decrease in the write processing performance.

Thus, in Embodiment 5, the storage controller 100, based on statistical information such as the frequency of write I/O access to or the number of erasure cycles of each flash box 210, migrates segments between the flash boxes 210. Accordingly, the frequency of write I/O access, the number of erasure cycles, and the like can be distributed evenly across each of the plurality of flash boxes 210, so that the system performance can be maximized and the lifetime of each flash box 210 can be extended.

To that end, in Embodiment 5, the storage controller 100 and the flash controller 220 exchange statistical information such as the number of data erasure cycles of each flash box 210.

Figure 29:
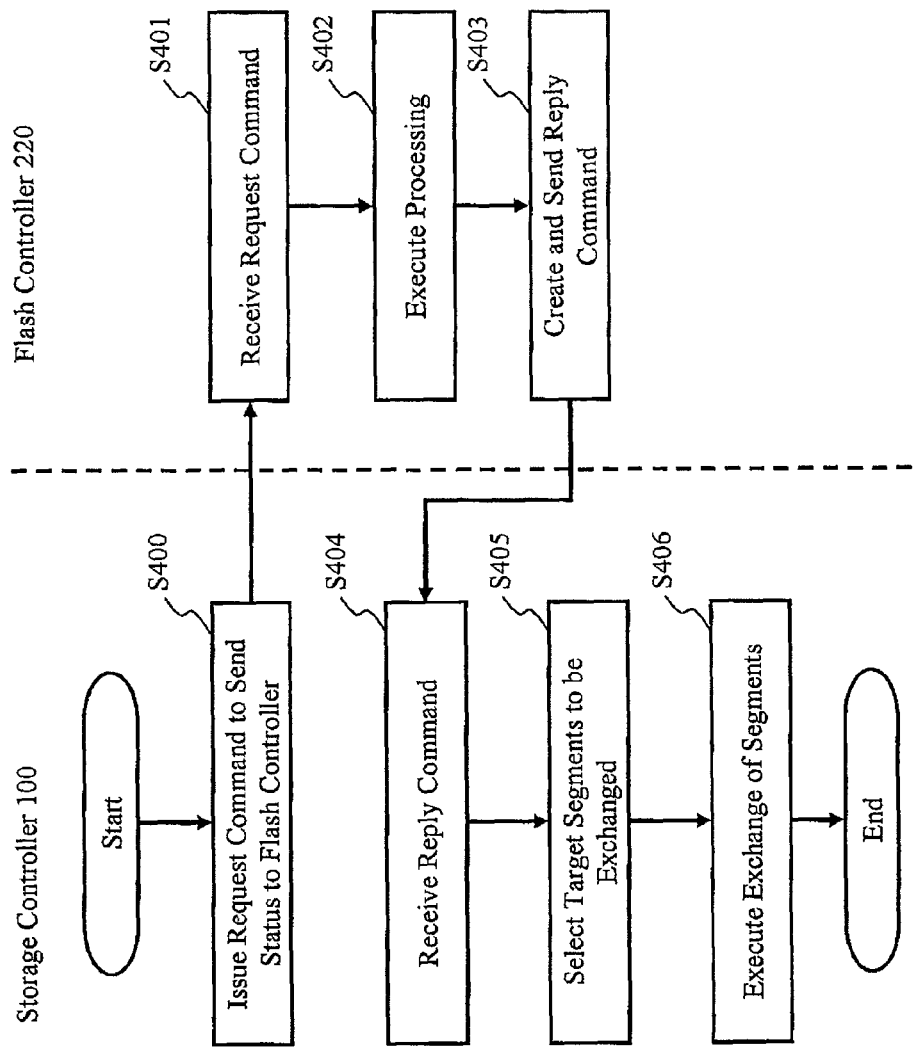
FIG. 29 is a flow chart showing the processing in which the storage controller 100 makes equal the load on each flash box 210.

FIG. 29 is a flow chart showing the processing in which the storage controller 100 makes equal the load on each flash box 210. Hereinafter, each step of FIG. 29 will be described.

(FIG. 29: Step S400)
The storage controller 100 creates the request command 100 to request the flash controller 220 to send statistical information on the flash boxes 210, and sends it to the flash controller 220.

(FIG. 29: Step S401)
The flash controller 220 receives the request command 1000.

(FIG. 29: Step S402)
The flash controller 220 acquires the statistical information on the flash boxes 210 based on the content of the request command 1000. Specifically, the flash controller 220 first acquires the status of each block 232 with reference to the block management table 22423. Next, the flash controller 220 acquires statistical information such as the sum of the numbers of erasure cycles of all of the blocks 232 from the statistical information management table 1428.

(FIG. 29: Step S403)
The flash controller 220 creates the reply command 2000 corresponding to the request content of the request command 1000, and sends it to the storage controller 100.

(FIG. 29: Step S403: Supplement)
As the statistical information sent from the flash controller 220 to the storage controller 100 in this step, the following information can be considered: the numbers of the assigned normal blocks 236 and alternate blocks 237, the number of the blocks 232 to which GC or WL is executed, the residual number of valid pages, the number of data erasure cycles, and the like. The flash controller 220 is configured to be capable of sending a variety of statistical information on the flash boxes 210 in response to a request from the storage controller 100.

(FIG. 29: Step S404)
The storage controller 100 receives the reply command 2000 from the flash controller 220.

(FIG. 29: Step S405)
The storage controller 100 determines the target segments to be exchanged. For example, the storage controller 100 compares the number of data erasure cycles of each flash box 210 acquired from the flash controller 220 with the number of write commands 14282 in the statistical information management table 1428, and determines a segment with the greatest number of write commands to be allocated to the flash box 210 with the smallest number of data erasure cycles.

(FIG. 29: Step S406)
The storage controller 100 exchanges the segments based on the result of step S405. Accordingly, the frequency of access to each segment can be made equal and I/O processing can be distributed evenly across each flash box 210.

As described above, according to Embodiment 5, the storage controller 100 can acquire statistical information on the flash boxes 210 from the flash controller 220, and thus can make equal the load on each flash box 210 based on the acquired information. Accordingly, the number of data write cycles or data erasure cycles can be distributed evenly not only within each flash memory chip 231 but also across each flash box 210.

REFERENCE SIGNS LIST

10 Storage Device
100 Storage Controller
110 I/F Chip
120 NIC
130 CPU
140 Memory
141 Data Cache Area
1411 User Data
142 System Area
1421 Program Group
1422 LU Management Table
14221 LUN
14222 Flash Box No.
14223 Start LBA
14224 Last LBA
1423 Memory Management Table
14231 Cache Segment No.
14232 LUN
14233 LBA
14234 Length
1424 Transfer List
14241 List No.
14242 Transfer Source
14243 Transfer Destination
14244 Cache Segment No.
14245 Length
14246 LUN
14247 LBA
1425 Transfer Completion List 14251 Transfer List No.
1426 Segment Management Table
14261 Segment No.
14262 Flash Box No.
14263 Start LBA
14264 Last LBA
1427 LU Management Table
14271 LUN
14272 LU Size
14273 Segment No.
1428 Statistical Information Management Table
14281 Segment No.
14282 Number of Write Commands
14283 Number of Read Commands
150 ASICs
151 DMA Transfer Unit
160 I/F Chip
170 Connection Bus
180 Dedicated Bus
190 Connection Bus
200 Flash Box Unit
210 Flash Box
220 Flash Controller
221 I/F Chip
222 CPU
223 ASICs
2231 DMA Transfer Unit
2232 Memory Controller
224 Memory
2241 Data Cache Area
22411 User Data
2242 System Area
22421 Program Group
22422 Address Management Table
224221 Start LBA
224222 Chip No.
224223 Block No.
224224 Page No.
22423 Block Management Table
224231 Chip No.
224232 Block No.
224233 Attribute
224234 Status
224235 Residual Number of Valid Pages
224236 Number of Erasures
22424 Transfer List
225 Dedicated Bus
226 Dedicated Bus
227 Dedicated Bus
230 Memory Array
231 Flash Memory Chip
232 Block
233 Page
234 Base Area
235 Update Area
236 Normal Block
237 Alternate Block
20 SAN
30 LAN
40 Host Computer
1000 Request Command
1001 Command No.
1002 Request Content
1003 Start Address
1004 Write Request Size
2000 Reply Command
10000 Storage System

What is claimed is:

1. A storage apparatus comprising:
a plurality of flash packages, each of the plurality of flash packages including a plurality of flash memory chips for storing data and a flash controller configured to control an operation of the plurality of flash memory chips; and
a storage controller configured to send a read/write command to the plurality of flash packages,
wherein the storage controller is configured to send a querying command before sending the read/write command to a first flash package of the plurality of flash packages,
wherein in response to receiving the querying command, a first flash controller of the first flash package makes a determination whether the first as controller has executed a garbage collection or not and sends a reply command indicating whether or not permission is granted to send the read/write command based on the determination, and
wherein the storage controller waits to send the read/write command to the first flash package until the storage controller receives the reply command indicating permission is granted to send the read/write command.

2. The storage apparatus according to claim 1, wherein the first flash controller executes the garbage collection to secure a sufficient capacity in the plurality of flash memory chips.

3. The storage apparatus according to claim 1,
wherein the storage controller sends the read/write command to the first flash package upon receipt, from the first flash controller, of the reply command indicating permission to send the read/write command to the first flash package, and
wherein the storage controller sends the read/write command to a second flash package of the plurality of flash packages upon receipt of a reply from the first flash controller that does not indicate permission to send the read/write command to the first flash package.

4. The storage apparatus according to claim 1, wherein when the storage controller waits to send the read/write command to the first flash package until the reply command indicating permission is granted to send the read/write command, the storage controller waits for a wait time, the wait time being a predetermined amount of time.

5. The storage apparatus according to claim 1,
wherein the first flash controller sends a reply command to the storage controller, the rely command indicating a wait time for the storage controller, and
wherein the storage controller waits for the wait time indicated by the reply command sent from the first flash controller.

6. The storage apparatus according to claim 5, wherein the wait time is determined based on the time required for the flash controller to execute the garbage collection.

7. A storage apparatus comprising:
a plurality of flash packages, each of the plurality of flash packages including a plurality of flash memory chips for storing data and a flash controller configured to control an operation of the plurality of flash memory chips; and
a storage controller configured to send a read/write command to the plurality of flash packages,
wherein the storage controller is configured to send a querying command before sending the read/write command to a first flash package of the plurality of flash packages,
wherein in response to receiving the querying command, a first flash controller of the first flash package makes a determination whether the first flash controller has executed a wear leveling or not and sends a reply command indicating whether or not permission is granted to send the read/write command based on the determination, and wherein the storage controller waits to send the read/write command to the first flash package until the storage controller receives the reply command indicating permission is granted to send the read/write command.

8. The storage apparatus according to claim 7, the first flash controller executes the wear leveling to make equal the number of write operations performed to each of the plurality of flash memory chips.

9. The storage apparatus according to claim 8,
wherein the storage controller sends the read/write command to the first flash package upon receipt, from the first flash controller, of the reply command indicating permission to send the read/write command to the first flash package, and
wherein the storage controller sends the read/write command to a second flash package of the plurality of flash packages upon receipt of a reply from the first flash controller that does not indicate permission to send the read/write command to the first flash package.

10. The storage apparatus according to claim 8, wherein when the storage controller waits to send the read/write command to the first flash package until the reply command indicating permission is granted to send the read/write command, the storage controller waits for a wait time, the wait time being a predetermined amount of time.

11. The storage apparatus according to claim 8,
wherein the first flash controller sends a reply command to the storage controller, the rely command indicating a wait time for the storage controller, and
wherein the storage controller waits for the wait time indicated by the reply command sent from the first flash controller.

12. The storage apparatus according to claim 11, wherein the wait time is determined based on the time required for the flash controller to execute the wear leveling.

13. A storage apparatus comprising:
a plurality of flash packages, each of the plurality of flash packages including a plurality of flash memory chips for storing data and a flash controller configured to control an operation of the plurality of flash memory chips; and
a storage controller configured to send a read/write command to the plurality of flash packages,
wherein the storage controller is configured to send a querying command before sending the read/write command to a first flash package of the plurality of flash packages,
wherein in response to receiving the querying command, a first flash controller of the first flash package makes a determination whether the first flash controller should execute a garbage collection or not and sends a reply command indicating whether or not permission is granted to send the read/write command based on the determination, and
wherein the storage controller waits to send the read/write command to the first flash package until the storage controller receives the reply command indicating permission is granted to send the read/write command.

14. The storage apparatus according to claim 13,
wherein the first flash controller makes the determination by determining, from a write request size included in the read/write command, a number of pages necessary to store the data,
wherein when the number of pages determined to be necessary is insufficient, the first flash controller determines that the garbage collection will be executed, and
when the number of pages determined to be necessary is sufficient, the first flash controller determines that the garbage collection will not be executed.

15. The storage apparatus according to claim 14,
wherein each of the plurality of flash memory chips includes a plurality of blocks, each block including a plurality of pages, and each block having a corresponding residual number of valid pages, the residual number of valid pages indicating a residual number of the pages that are assigned as an update area within a relevant block,
wherein the first flash controller makes the determination by calculating a number of pages, of the plurality of pages, that is necessary to store the data,
wherein the number of pages necessary is calculated by dividing a write request size included in the read/write command by the size of a page of the plurality of pages,
wherein when the quotient is greater than a residual number of valid pages of the relevant block, the first flash controller determines that the garbage collection will be executed, and
wherein when the quotient is less than or equal to the residual number of valid pages of the relevant block, the first flash controller determines that the garbage collection will not be executed.

16. The storage apparatus according to claim 14,
wherein the storage controller sends the read/write command to the first flash package upon receipt, from the first flash controller, of the reply command indicating permission to send the read/write command to the first flash package, and
wherein the storage controller sends the read/write command to a second flash package of the plurality of flash packages upon receipt of a reply from the first flash controller that does not indicate permission to send the read/write command to the first flash package.

17. The storage apparatus according to claim 14, wherein when the storage controller waits to send the read/write command to the first flash package until the reply command indicating permission is granted to send the read/write command, the storage controller waits for a wait time, the wait time being a predetermined amount of time.

18. The storage apparatus according to claim 17,
wherein the first flash controller sends a reply command to the storage controller, the rely command indicating a wait time for the storage controller, and
wherein the storage controller waits for the wait time indicated by the reply command sent from the first flash controller.

19. The storage apparatus according to claim 18, wherein the wait time is determined based on the time required for the flash controller to execute the garbage collection.

* * * * *